(12) United States Patent
Kota et al.

(10) Patent No.: US 11,174,002 B2
(45) Date of Patent: Nov. 16, 2021

(54) EDGE MORPHING ARRANGEMENT FOR AN AIRFOIL

(71) Applicant: FlexSys, Inc., Ann Arbor, MI (US)

(72) Inventors: Sridhar Kota, Ann Arbor, MI (US); Gregory F. Ervin, Canton, MI (US); Jia-Hsuan Lo, Ann Arbor, MI (US); Kerr-Jia Lu, Ann Arbor, MI (US); Dragan Maric, Ann Arbor, MI (US); Mark R. Trost, Ann Arbor, MI (US); Ruey-Khan K. Tsang, Ann Arbor, MI (US)

(73) Assignee: FlexSys, Inc., Ann Arbor, MI (US)

( * ) Notice: Subject to any disclaimer, the term of this patent is extended or adjusted under 35 U.S.C. 154(b) by 437 days.

(21) Appl. No.: 16/079,369

(22) PCT Filed: Feb. 28, 2017

(86) PCT No.: PCT/US2017/019886
§ 371 (c)(1),
(2) Date: Aug. 23, 2018

(87) PCT Pub. No.: WO2017/151580
PCT Pub. Date: Sep. 8, 2017

(65) Prior Publication Data
US 2019/0061910 A1 Feb. 28, 2019

Related U.S. Application Data

(60) Provisional application No. 62/301,143, filed on Feb. 29, 2016.

(51) Int. Cl.
*B64C 3/48* (2006.01)
*B64C 3/44* (2006.01)
*B64C 9/16* (2006.01)

(52) U.S. Cl.
CPC ............... *B64C 3/48* (2013.01); *B64C 9/16* (2013.01); *B64C 2003/445* (2013.01);
(Continued)

(58) Field of Classification Search
CPC .... B64C 3/48; B64C 3/50; B64C 3/52; B64C 2003/445
(Continued)

(56) References Cited

U.S. PATENT DOCUMENTS

| 4,351,502 A * | 9/1982 | Statkus | B64C 3/48 244/214 |
| 5,887,828 A | 3/1999 | Appa | |

(Continued)

FOREIGN PATENT DOCUMENTS

| CA | 2892804 A1 | 6/2014 | |
| CA | 3016039 A1 * | 9/2017 | ............... B64C 3/48 |

(Continued)

OTHER PUBLICATIONS

United States Patent and Trademark Office, Alexandria, Virginia, International Search Report of International Application No. PCT/US2017/019886, dated May 25, 2017, 2 pages.

*Primary Examiner* — Christopher P Ellis
(74) *Attorney, Agent, or Firm* — Dickinson Wright PLLC

(57) ABSTRACT

An edge-morphing arrangement for an airfoil includes a compliant upper surface and a compliant lower surface that are joined together. An actuator is coupled to a driven surface and actuated to move the driven surface and change the shape thereof, with the non-driven surface changing its shape in response to actuation of the driven surface. The upper and lower surfaces can be part of a sub-flap mounted to a traditional flap of the fixed wing of an airplane. The upper and lower surfaces can be mounted to existing structure in the flap, or the flap components can be mounted to the (Continued)

sub-flap. The upper and lower surfaces can alternatively replace the traditional flap in the fixed wing of an aircraft. The upper and lower surfaces are continuous and can be deflected upward, downward, or twisted in a span-wise direction relative to the flap or wing.

20 Claims, 19 Drawing Sheets

(52) U.S. Cl.
CPC ............... *Y02T 50/10* (2013.01); *Y02T 50/30* (2013.01); *Y02T 50/40* (2013.01)

(58) Field of Classification Search
USPC ......................................................... 244/219
See application file for complete search history.

(56) References Cited

U.S. PATENT DOCUMENTS

| | | | |
|---|---|---|---|
| 6,045,096 A | 4/2000 | Rinn et al. | |
| 6,070,834 A * | 6/2000 | Janker | B64C 3/48 244/213 |
| 6,276,641 B1 * | 8/2001 | Gruenewald | B64C 3/48 244/213 |
| 7,384,016 B2 * | 6/2008 | Kota | B64C 3/48 244/123.1 |
| 8,408,870 B2 * | 4/2013 | Rebsdorf | F03D 1/0641 416/23 |
| 9,033,283 B1 * | 5/2015 | Hemmelgarn | F03D 1/0675 244/219 |
| 9,759,191 B2 * | 9/2017 | Betran Palomas | F03D 1/0675 |
| 9,896,188 B1 * | 2/2018 | Joo | B64C 3/185 |
| 10,272,984 B2 * | 4/2019 | Siers | B64C 3/38 |
| 10,392,088 B2 * | 8/2019 | Morel | B64C 3/52 |
| 10,507,909 B2 * | 12/2019 | Cave | B64C 27/82 |
| 10,654,557 B2 * | 5/2020 | Xi | B64C 3/38 |
| 2006/0157623 A1 * | 7/2006 | Voglsinger | B64C 3/48 244/219 |
| 2007/0152106 A9 * | 7/2007 | Perez-Sanchez | B64C 3/48 244/219 |
| 2008/0226448 A1 | 9/2008 | Altmikus et al. | |
| 2009/0302168 A1 * | 12/2009 | Hetrick | B64C 3/52 244/214 |
| 2010/0133387 A1 | 6/2010 | Wood et al. | |
| 2010/0259046 A1 | 10/2010 | Kota et al. | |
| 2013/0233976 A1 * | 9/2013 | Nagel | B64C 9/00 244/201 |
| 2015/0083853 A1 | 3/2015 | Moser et al. | |
| 2016/0009372 A1 * | 1/2016 | Grip | B64C 9/24 244/214 |
| 2016/0137314 A1 * | 5/2016 | Storm | B64F 5/00 29/897.2 |

FOREIGN PATENT DOCUMENTS

| | | | |
|---|---|---|---|
| CN | 104443354 A | 3/2015 | |
| DE | 102008022422 A1 | 11/2009 | |
| DE | 102013006166 A1 | 10/2014 | |
| EP | 0905019 A2 | 3/1999 | |
| EP | 2955102 A1 * | 12/2015 | ............... B64C 3/48 |
| EP | 2955102 A1 | 12/2015 | |
| GB | 2486876 A | 7/2012 | |
| SU | 1762488 A1 | 4/1994 | |
| WO | WO-2011017071 A2 * | 2/2011 | ............... B64C 3/50 |

* cited by examiner

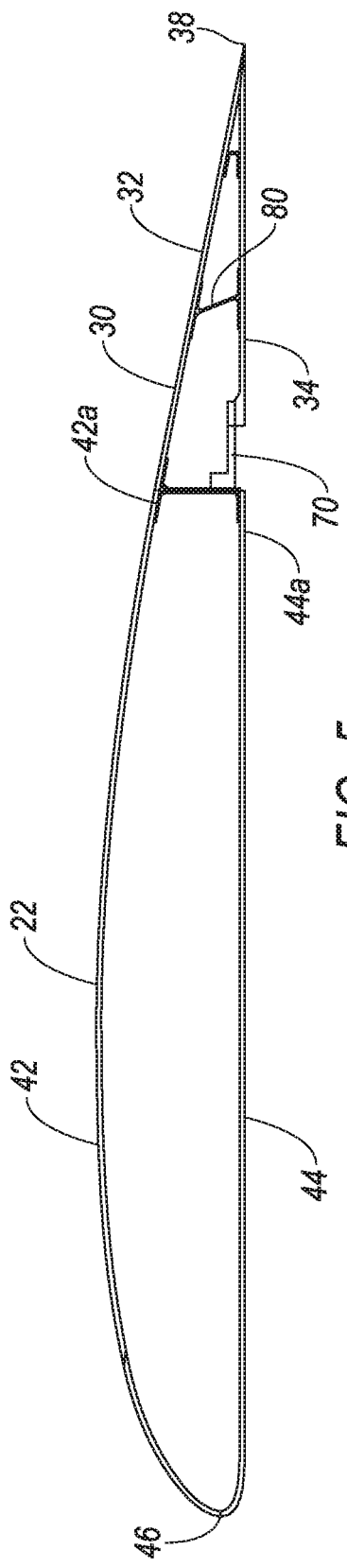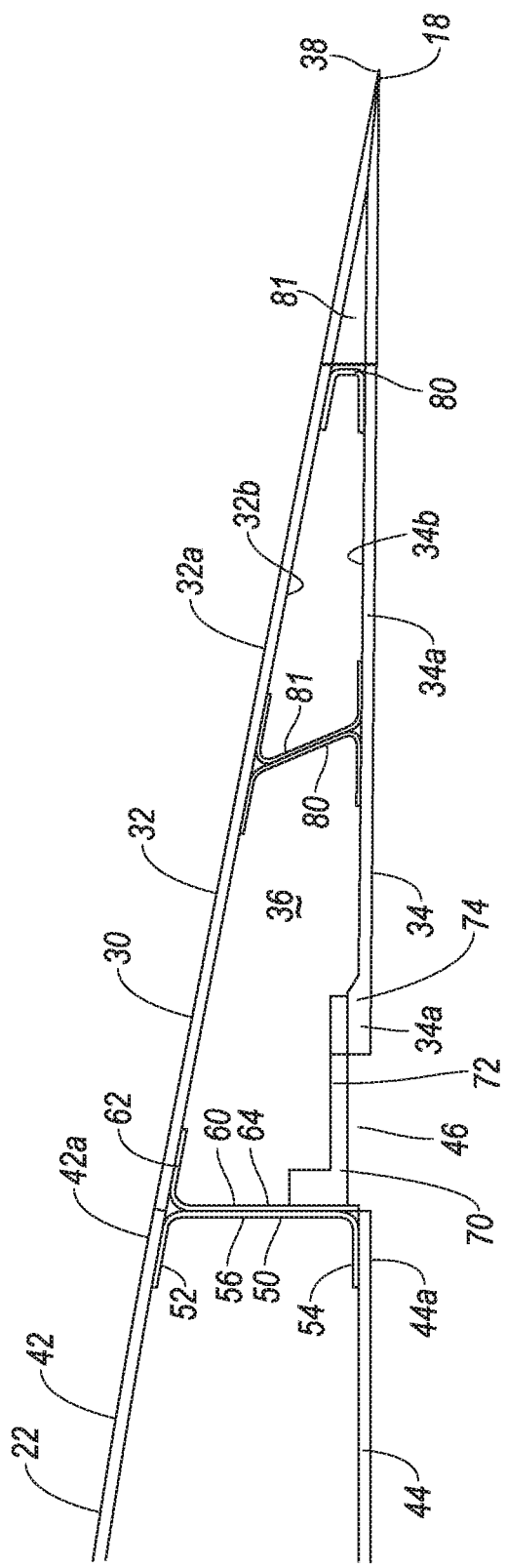

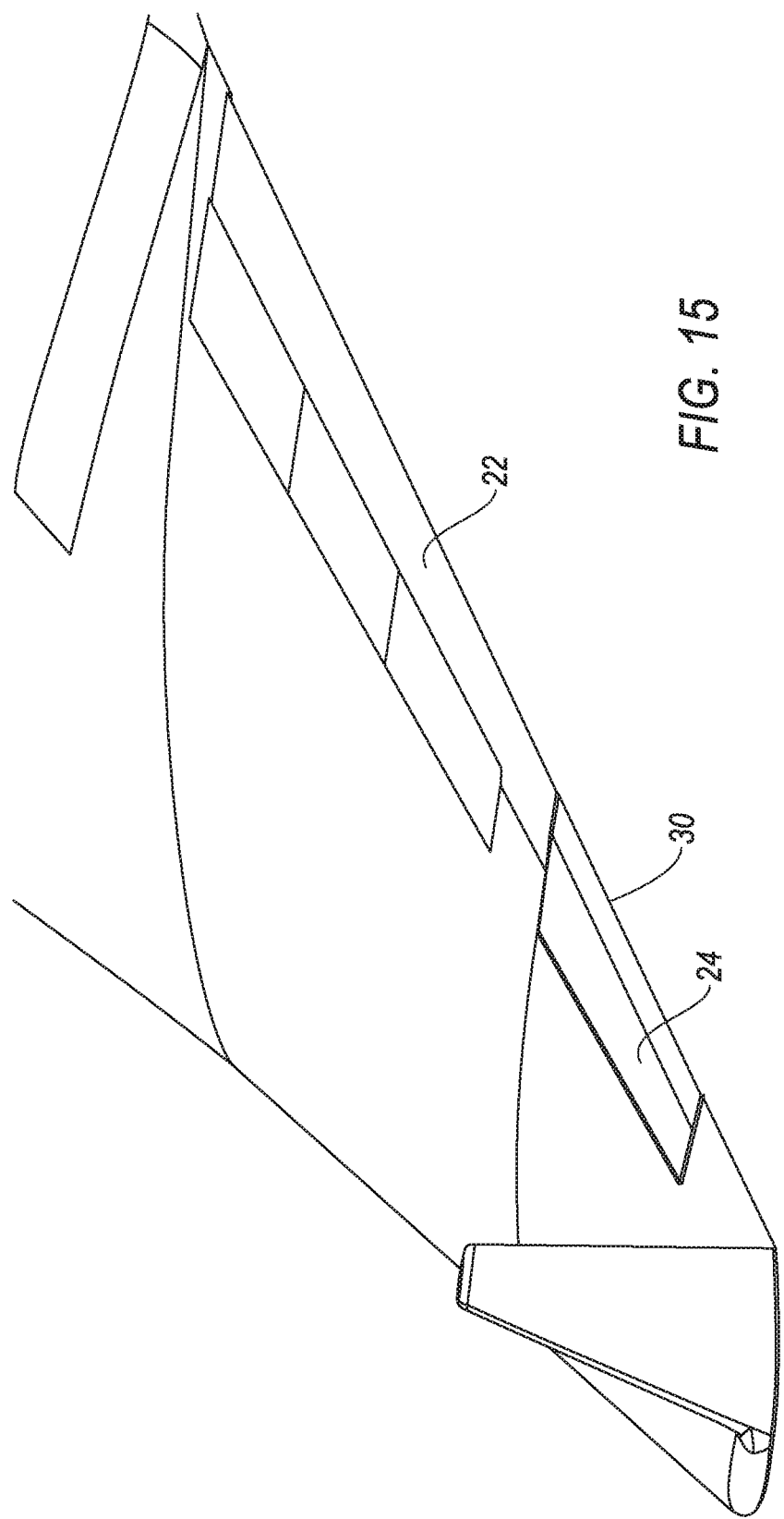

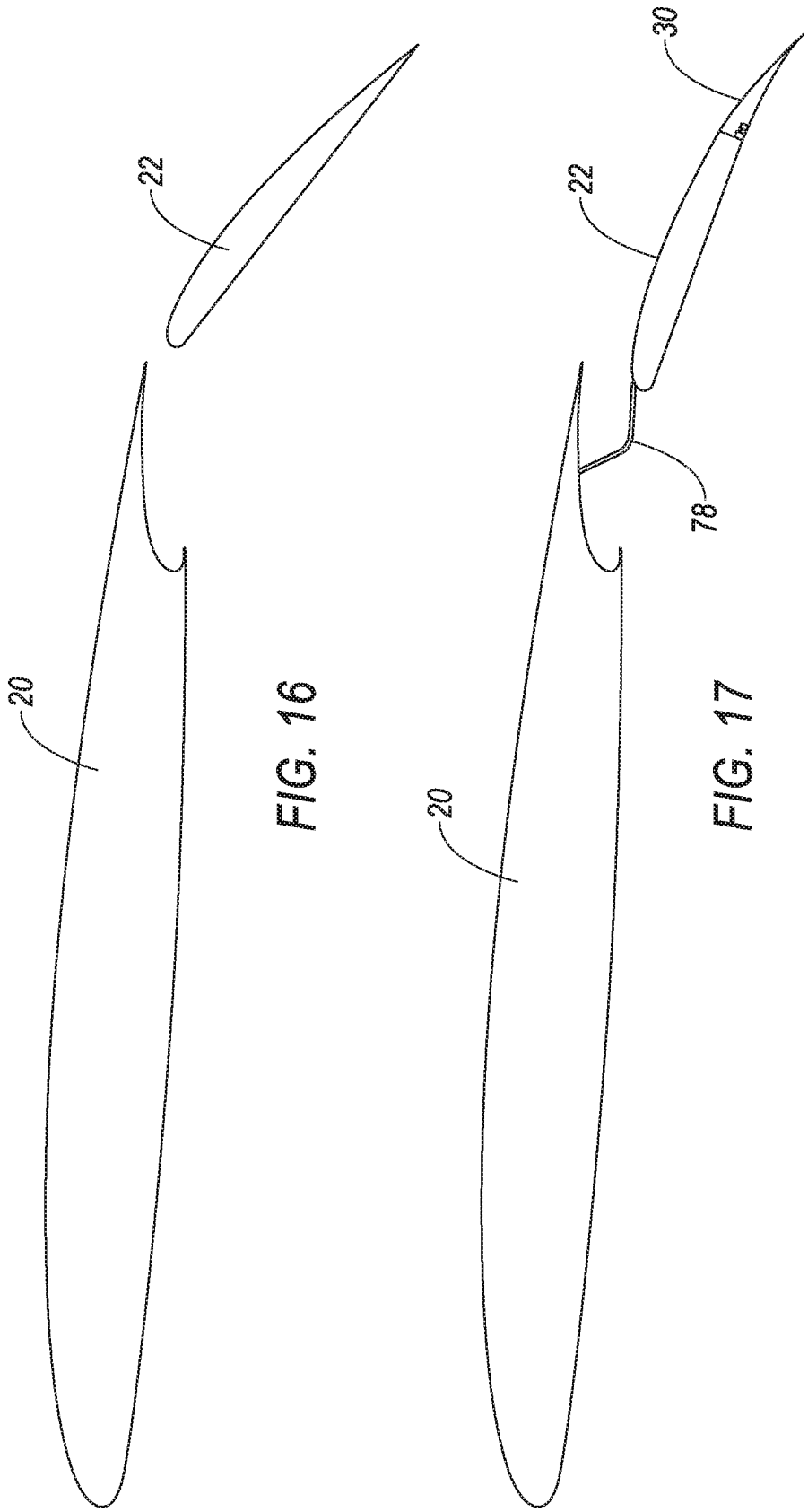

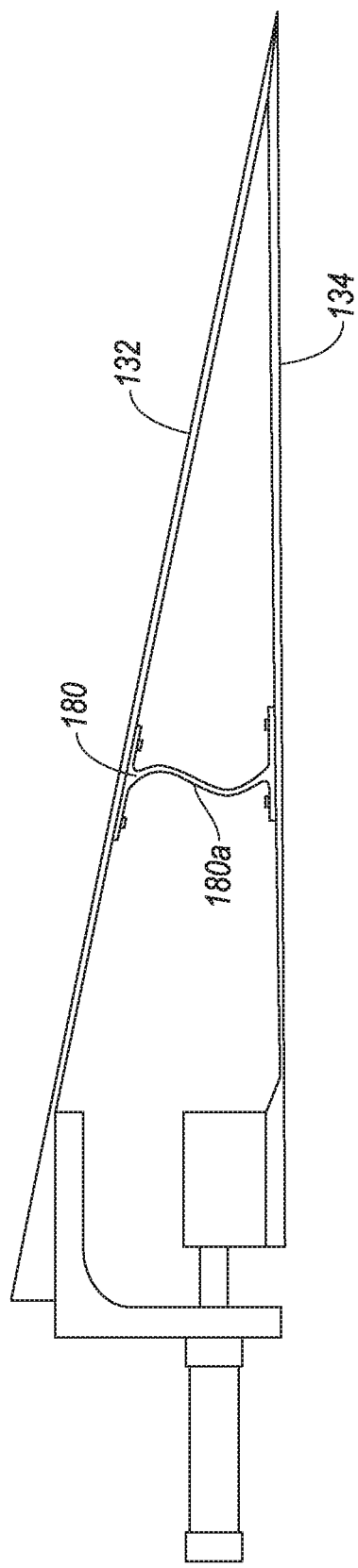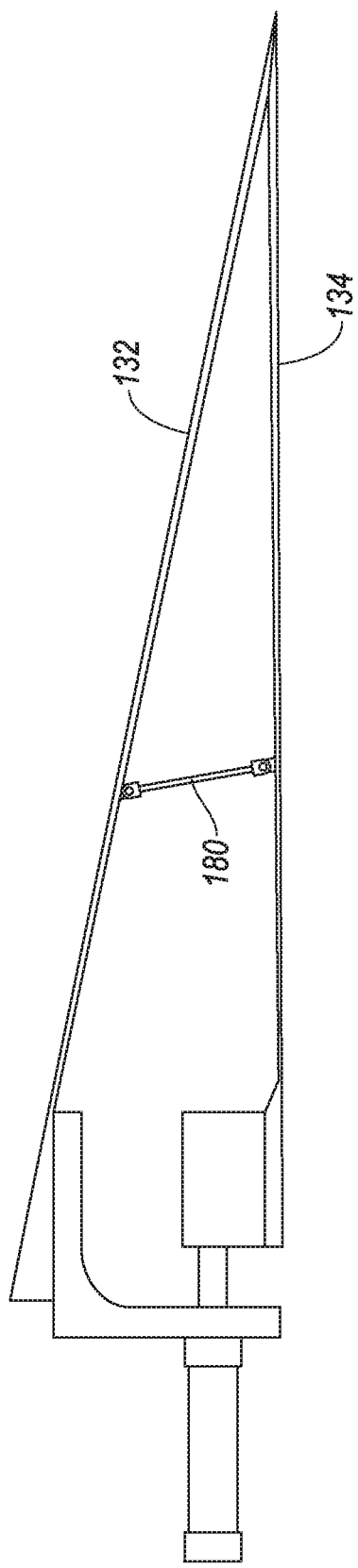

EDGE MORPHING ARRANGEMENT FOR AN AIRFOIL

CROSS-REFERENCE TO RELATED APPLICATION

This application claims the benefit of priority to U.S. Provisional Application Ser. No. 62/301,143, filed Feb. 29, 2016, the content of which is hereby incorporated by reference in its entirety.

BACKGROUND OF THE INVENTION

1. Field of the Invention

This invention relates generally to systems for producing adaptive compliant surface contours, such as for wings, rotor blades, and other control surfaces for aircraft, surface and submersible water craft, and the like, and more particularly, to a system that produces a variable surface contour of control surfaces for fixed wing and rotary wing aircraft.

2. Description of the Related Art

A need for surfaces having an adjustable or variable contour is present in a wide variety of applications, ranging from aircraft and water craft control surfaces to specialized furniture. Absent the ability to vary the surface contour in any such application results in the creation of products and systems that are not optimally designed, but instead are configured as compromises between conflicting design goals. In the case of airfoils for aircraft, it is known that overall drag results from the combination of friction between the airfoil and the air flowing there around, and the lift component of force supplied to an aircraft wing. In such an application, innumerable variations can be effected between airfoil thickness, airfoil camber, airfoil length and width, and the like. The conventional airfoil, therefore, is but the implementation of an engineering compromise to effect an acceptable lift:drag ratio, which is a primary flight control parameter. There is a need, therefore, for an arrangement that enables advantageous variation in the shape of an airfoil and the contour of the associated control surfaces.

There is a need for an arrangement for varying the dimensions and contours of airfoils, such as aircraft wings, so as to optimize same for different flight conditions. Thus, for example, the wing configuration that would be optimum for stable, undisturbed flight would be different from the wing configuration that would be optimized during takeoff and landing. It would additionally be advantageous if the contour of the airfoil is adjusted in a manner that is not constant throughout the length of the airfoil, but which varies, illustratively to form a twist along the control surface of the wing. There is a need for optimizing the configuration and contour of such surfaces in other applications, such as in hydrofoils for water craft and spoilers for high speed land vehicles.

In addition to the foregoing, there is a need for a system that affords advantageous variation of a surface contour for applications unrelated to airfoils, hydrofoils, spoilers, and the like. Such other applications may include, for example, adjustable seating surfaces, including back supports as well as fluid passageways, the dimensions of which are desired to be varied, such as an air intake passageway for an engine of a vehicle.

It is, therefore, an object of this invention to provide a simple and economical arrangement for varying a contour of a surface.

BRIEF DESCRIPTION OF THE DRAWINGS

FIG. 5 is a cross-sectional view of the flap and sub-flap, illustrating upper and lower surfaces of the flap and sub-flap;

FIG. 6 is a partial cross-sectional view of the flap and sub-flap;

FIG. 15 is an isometric view illustrating a sub-flap attached to an aileron;

FIG. 16 is a cross-sectional view of a traditional flap in an extended and pivoted state;

FIG. 17 is a cross-sectional view of the flap and sub-flap in an extended and pivoted state with the sub-flap being deflected downward relative to the flap, with the flap extended a smaller degree than in FIG. 16;

FIG. 28 is a cross-sectional view of the compliant flap illustrating an alternative stringer having a curved body portion;

FIG. 29 is a cross-sectional view of the compliant flap illustrating an alternative stringer in the form of a flexible member.

DETAILED DESCRIPTION

Figure 1:
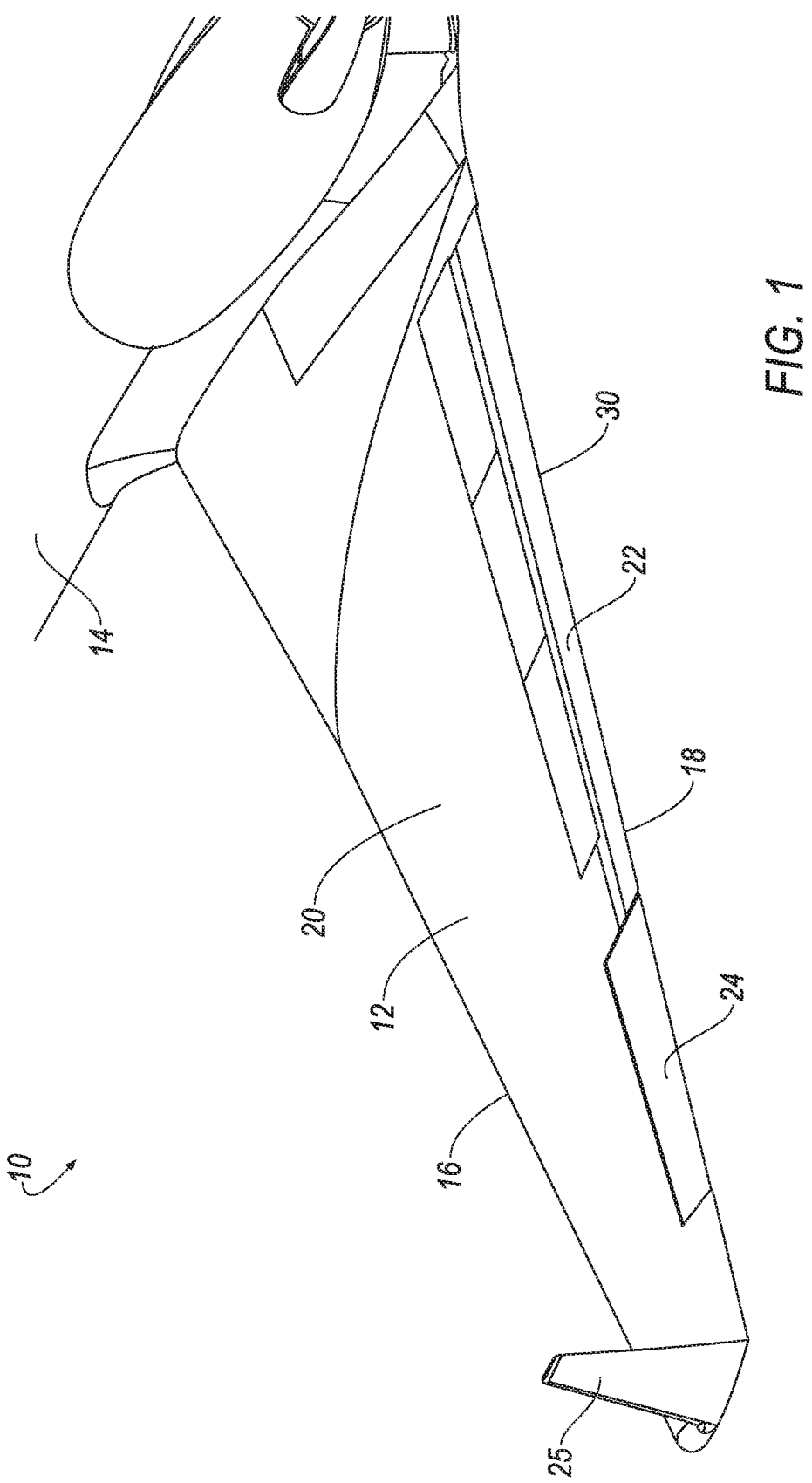
FIG. 1 is a partial isometric view of an aircraft having a fixed wing, a flap, and a sub-flap attached to the flap.

FIG. 1 illustrates an aircraft 10 that includes a wing 12 extending from an aircraft body 14 in a manner known in the art. A corresponding wing (not shown) extends from an opposite side of the aircraft body 14. As illustrated, the aircraft 10 is in the form of an airplane.

The wing 12 is in the form of an airfoil and includes a leading edge 16 and a trailing edge 18. The leading edge 16 is disposed at the front of a generally fixed wing body 20. The wing body 20 is fixed in the sense that it is typically not actuated and does not undergo an active position change, where movement of the wing body 20 will generally occur only in response to loads that the wing 10 undergoes during flight conditions, including takeoff, landing, and cruising conditions, as known in the art.

The wing 10 further includes a flap member 22 that is attached and coupled to the fixed wing body 20. The flap member 22 is positioned rearward of the wing body 20 and can define the trailing edge 18 or a portion of the trailing edge 18. The flap member 22 is attached and coupled to the fixed wing body 20 in a manner known in the art such that the flap member 22 is extendable rearward relative to the wing body 20, and is also pivotable relative to the wing body 20. Thus, the flap member 22 can be extended rearward and also pivoted downward relative to the wing body 20, and further pivoted upward and retracted in the forward direction, as desired during different flight conditions, such as takeoff, landing, and cruising conditions.

Figure 2:
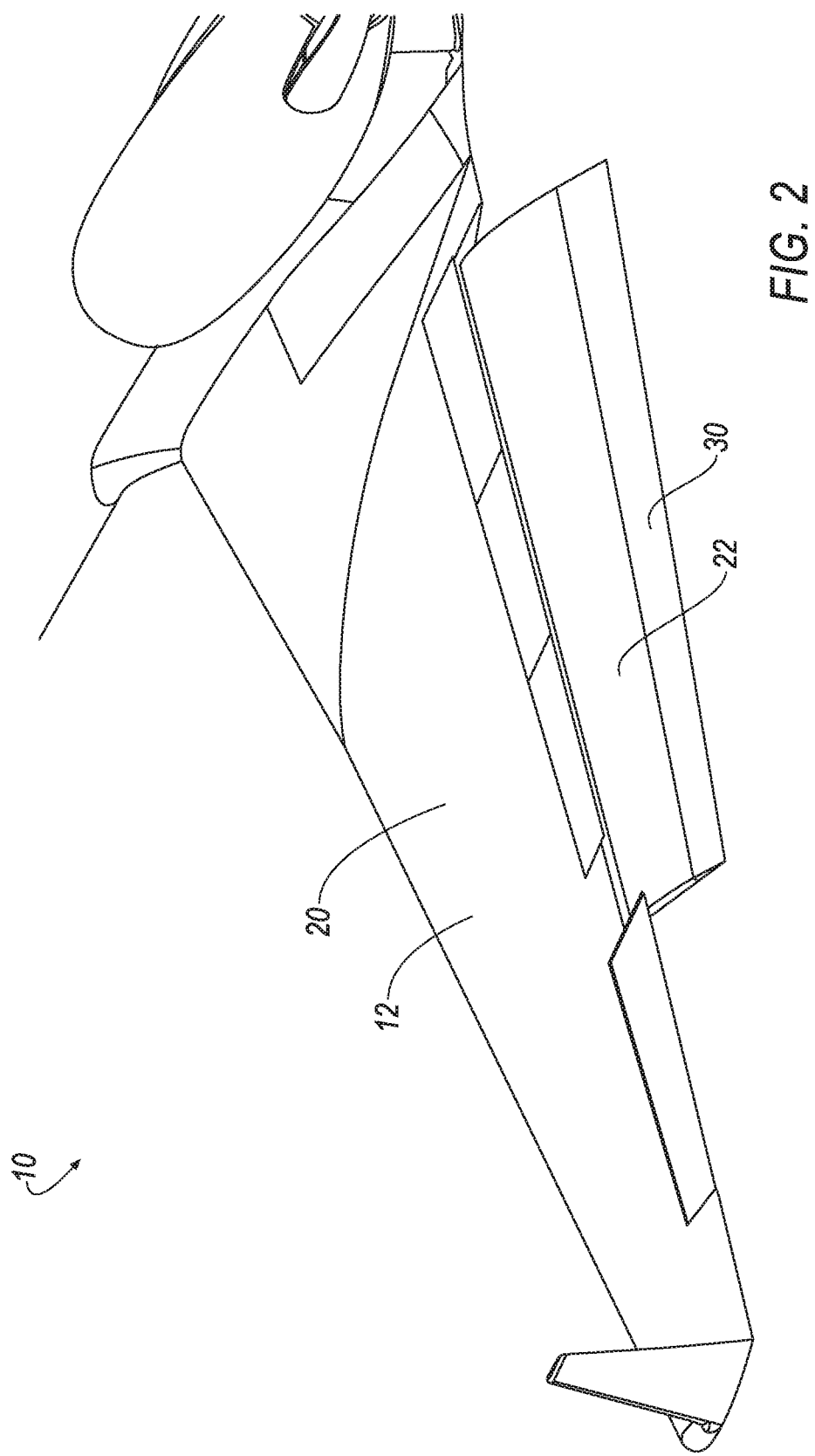
FIG. 2 is a partial isometric view of the aircraft having the flap and sub-flap in an extended position.

The wing 12 can further include an aileron 24 disposed outboard of the flap 22 and between the flap 22 and the outer end of the wing 10. The aileron 24, similar to the flap 22, can pivot downward from a normal position relative to the wing body 20 and can pivot upward from a downward position back to the normal position as desired as is known in the art. FIG. 1 illustrates the flap 22 in a retracted and stowed position, which is a typical position during cruising flight conditions. FIG. 2 illustrates the flap 22 in an extended position; being moved rearward as well as pivoted downward (negative deflection).

As shown in FIGS. 1 and 2, the flap 22 further includes a sub-flap 30, sometimes referred to as a trim-tab. The sub-flap 30 is disposed at a rear portion of the flap 22 and defines, in part, the trailing edge 18 of the wing 10. As further described below, the sub-flap 30 is moveable relative to the flap 22, and the sub-flap 30 is therefore moveable relative to the wing body 20 as a compound movement of the flap 22 relative to the wing body 20 and the sub-flap 30 relative to the flap 22. The sub-flap 30 is also moveable relative to the wing body 20 independent of movement of the flap 22. Movement of the sub-flap 30 is a result of displacement of the sub-flap 30 or deformation of the sub-flap 30, or a combination of both. Displacement of the sub-flap 30 can occur due to rigid body movement such as pivoting or translating or a combination of pivoting and translating. Deformation of the sub-flap 30 can be done intentionally to effectuate shape morphing in the sub-flap 30, as further described below, or deformation can be caused by external loading, such as wing body flexing during flight.

Figure 3:
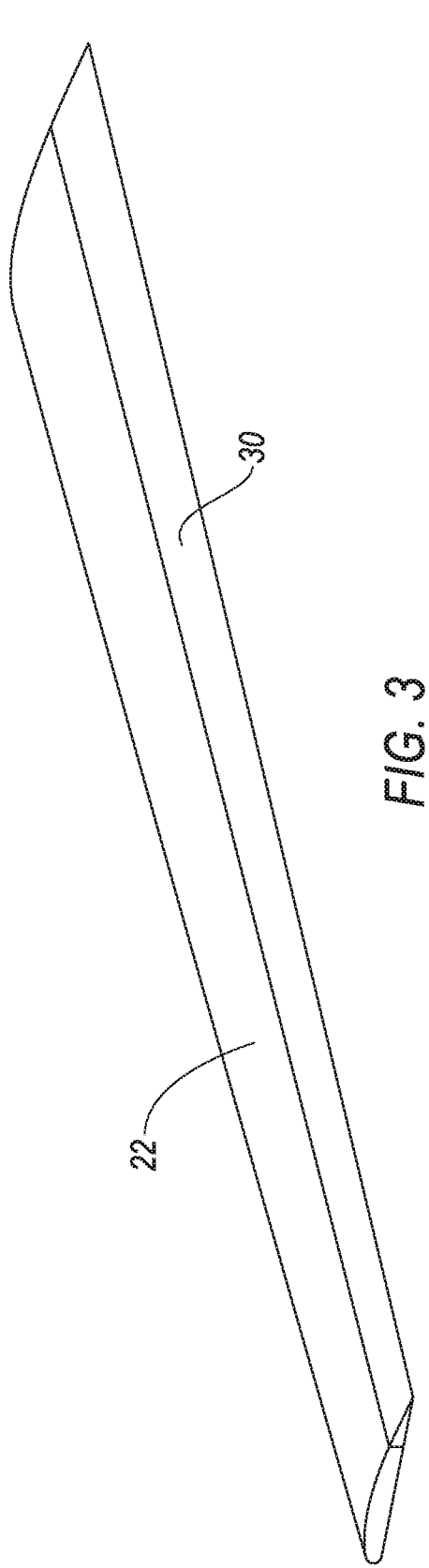
FIG. 3 is an isometric view of the flap and sub-flap.
Figure 4:
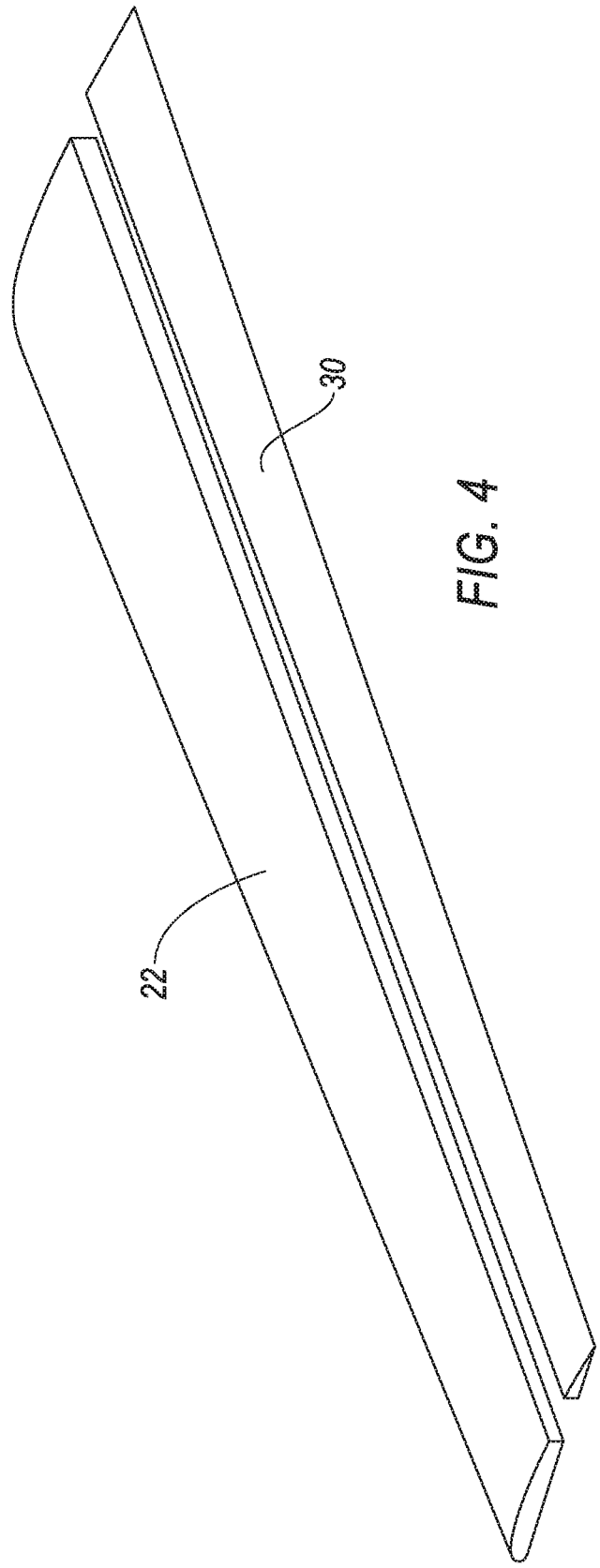
FIG. 4 is an exploded view of the flap and sub-flap.

FIGS. 3 and 4 illustrate the flap 22 and sub-flap 30 isolated from the rest of the wing 12 and the wing body 20. FIG. 3 illustrates the sub-flap 30 being disposed at the rear of the flap 22, and FIG. 4 illustrates an exploded view of the flap 22 and sub-flap 30.

The sub-flap 30 is in the form of a compliant structure that can change its shape to conform to different flight conditions or to effect different flight maneuvers or conditions for various reasons. The compliant structure of the sub-flap 30 is flexible and resilient with sufficient resilience to change shape or morph when a force is exerted thereon. The compliant structure of the sub-flap 30 is capable of sustaining external loads, such that the sub-flap 30 is a load-bearing compliant structure.

With reference to FIGS. 5 and 6, the sub-flap 30 includes a compliant upper surface 32 and a compliant lower surface 34. The upper surface 32 and lower surface 34 are resilient and conformable to different shapes in response to being actuated, as further described below. As used herein, the term "surface" refers to the overall compliant structure disposed in an upper region or a lower region of the sub-flap.

The upper and lower surfaces 32 and 34 may be made of a single sheet or ply and have a monolithic structure such that the structure is solid in the span-wise and chord-wise direction, as well as vertically. The surfaces may, alternatively, be made from multiple plies that are layered over each other and bonded to each other in a manner known in the art. Each ply of the multi-ply can be continuous and solid in the span-wise and chord-wise direction, as well as vertically. The combination of plies would not be continuous vertically, as they would be separate structures layered on top of each other. The plies may have different overall shapes, such that layering of the plies can result in different overall thicknesses at different locations span-wise or chord-wise, where a portion of the overall surface would have fewer plies in some regions, making it thinner in a vertical direction, or may have more plies in other regions, making it thicker.

With reference to FIG. 6, each of the upper surface 32 and the lower surface 34 includes inner and outer surfaces. In particular, the upper surface 32 defines an upper outer surface 32a and an upper inner surface 32b, and the lower surface 34 defines a lower outer surface 34a and a lower inner surface 34b. The upper and lower inner surfaces 32b, 34b are arranged to face each other and oppose each other. The upper and lower outer surfaces 32a, 34a each face away from each other are typically exposed to the environment outside of the sub-flap 30.

The sub-flap 30 also defines a cavity 36 disposed between the upper and lower surfaces 32, 34. The cavity is typically "open-air" having various structure or mechanisms disposed therein, such as for providing load bearing capabilities, linkage capabilities, or actuation of the upper and lower surfaces 32, 34. The structures disposed inside the cavity 36 will be described in further detail below.

In one approach, the upper and lower surfaces 32, 34 of the sub-flap 30 are arranged to converge at an apex 38 disposed at the rear edges of the surfaces 32, 34. The apex 38 thereby joins the upper surface 32 to the lower surface 34 and forms the portion of the trailing edge 18 defined by the sub-flap 30.

While the apex 38 has been described as being disposed at the rear edges of the surfaces 32, 34, the apex 38 may also be considered to include the rear portions of the surfaces 32, 34, such that the apex 38 is not necessarily limited to the ultimate rear-most point of the sub-flap 30. In one approach, the upper and lower surfaces 32, 34 may be coupled to each other via a stringer that extends between the upper and lower surfaces 32, 34 and connects the upper and lower surfaces 32, 34 together. The apex 38 may be considered to the structure that is disposed rearward of the rear-most stringer. The stringers that extend between the upper and lower surfaces 32, 34 are discussed in further detail below.

The sub-flap 30 is preferably configured to be attached to existing structure of a typical flap 22 used in traditional airplanes. In this manner, the sub-flap 30 will preferably replace the existing structure of the flap 22 in the area where the sub-flap 30 is to be installed. For example, the rearward portion of the flap 22 that includes a rear apex and defines the trailing edge is preferably removed from the flap 22, or not included in the initial construction of the flap 22. It will be appreciated, however, that the sub-flap 30 can be constructed and incorporated into the initial construction of the flap 22. For example, the upper surface of the flap 22 could be contiguous to include the upper surface of the sub-flap 30 in the same manufacturing step. As illustrated in FIGS. 1-6, the rear portion of the flap 22 has already been removed from the flap 22, or not included in the construction of the combination of the flap 22 and sub-flap 30.

As shown in FIG. 5, the flap 22 includes an upper surface 42 and a lower surface 44, which are joined together and define a front apex 46. The upper surface 42 typically has a convex curvature facing outward as is typical in the art, and the lower surface 44 is shown in FIG. 5 as having a generally flat arrangement. However, it will be appreciated that the surfaces of the flap 22 could have different shapes.

The upper surface 32 of the sub-flap 30 is sized and configured to mate with a rear edge 42a of the upper surface 42 of the flap 22 to define an upper interface. The lower surface 34 is sized and configured to extend toward a rear edge 44a of the lower surface 44 of the flap 22, such that the lower surface 34 of the sub-flap 30 and the lower surface 44 of the flap 22 are generally aligned and, in some cases, are coplanar when the sub-flap 30 is in a nominal or neutral and unactuated position relative to the flap 22. The nominal position is illustrated in FIGS. 5 and 6.

The lower surface 34 of the sub-flap 30 and the lower surface 44 of the flap 22 can also combine to define a gap 46 between the rear edge 44a of the lower surface 44 and a front edge 34a of the lower surface 34. This gap 46 allows for the sub-flap lower surface 34 to be actuated and move relative to the flap 22. For example, the sub-flap lower surface 34 can be pulled toward the flap 22, causing the gap 46 to become smaller, or it can be pushed away from the flap 22 to cause the gap 46 to become larger.

In another approach, the sub-flap lower surface 34 can contact the lower surface 44 of the flap 22 in a sliding and/or overlapping manner, or could be received within a slot defined by the flap lower surface 44 for sliding translation therein.

In yet another approach, the sub-flap lower surface 34 could be attached to or mate with the flap lower surface 44, similar to the illustrated interface between the upper surface 42 of the flap 22 and the upper surface 32 of the sub-flap 30, with the sub-flap lower surface 34 being made from a flexible and resilient material that can stretch longitudinally relative to the flap 22 when the sub-flap lower 34 surface is actuated.

In an alternative approach, the lower surfaces 34, 44 can mate with each other similar to the way the upper surfaces 32, 42 mate with each other as shown in FIGS. 5 and 6, that is, in a generally fixed manner. In this approach, the upper surfaces 32, 42 can combine to define a gap similar to gap 46, or they could mate with a flexible material extending therebetween, with the upper surface 32 being the surface that is driven relative to the flap 22.

Accordingly, it will be appreciated that either the upper surface 32 or the lower surface 34 can be referred to as a driven surface, and the other of the two surfaces 32, 34 can be referred to as a non-driven surface. However, this does not mean that the non-driven surface does not move or change shape; rather, the non-driven surface will change shape in response to moving the driven surface. As illustrated herein, the lower surface 34 is shown as the driven surface and the upper surface 32 is shown as the non-driven surface. It will also be appreciated that both surfaces 32 and 34 could be driven surfaces. For example, one of the surfaces 32 or 34 could be driven to effectuate a positive deflection of the sub-flap 30, and the other of the surfaces 32 or 34 could be driven to effectuate a negative deflection of the sub-flap 30, or both surfaces 32 and 34 could be driven simultaneously to create other deflection shapes.

The sub-flap 30 can be attached to the flap 22 in different ways. In one approach, illustrated in FIG. 6, the flap 22 includes a rear spar 50 that extends span-wise from an inner end of the flap 22 to an outer end of the flap 22. The rear spar 50 also extends generally vertically between the upper surface 42 and lower surface 44 of the flap 22. The rear spar 50 provides support and load bearing capabilities to the flap 22, and can also act as a mounting member to which various sub-flap components can be mounted. The flap 22 may include other spars at locations forward of the rear spar 50, as known in the art, and these additional spars have been removed for clarity.

The rear spar 50 can, in one approach, have a generally C-shaped cross-section (FIG. 6) having a pair of flanges 52, 54 that extend forward from the rear spar 50 and are disposed inside the upper and lower surfaces 42, 44 of the flap 22, respectively. The rear spar 50 further includes a body portion 56 that extends between the flanges 52, 54. It will be appreciated that the body portion may be aligned vertical, and could be arranged at an angle transverse to vertical in the nominal or articulated position of the flap 22.

The rear spar 50 can be attached to the upper and lower surfaces 42, 44 via riveting, welding, bonding, or other forms of mechanical attachment. The rear spar 50 functions as a mounting location for the sub-flap 30 to be mounted to the flap 22. However, as further described below, the rear spar 50 can be omitted while still allowing for the sub-flap 30 to be attached to the flap 22.

The sub-flap 30 can further include a mounting bracket 60, shown in FIG. 6, configured to be mounted to the rear spar 50 of the flap 22. The bracket 60, in one approach, is in the form of an L-shaped bracket having an upper flange 62 and body portion 64 extending downward from the flange 62. The flange 62 is attached or mounted to the upper surface 32 of the sub-flap via riveting, welding, bonding, or other types of mechanical attachment. The body portion 64 may be aligned vertically, and could also be aligned at different angles.

As shown in FIG. 6, the body portion 64 is sized and configured to mate with and attach to the body portion 56 of the rear spar 50. With the body portion 64 mounted to the rear spar 50, the upper surfaces 32, 42 and lower surfaces 34, 44 will preferably become aligned, resulting in an assembly of flap 22 and sub-flap 30 having an outer profile resembling a traditional flap when the sub-flap 30 is in a nominal position relative to the flap 22.

The sub-flap 30 is configured for changing its shape depending on various flight control needs that arise during operation of the aircraft. The shape of the sub-flap 30 will change in response to being actuated. More particularly, the upper surface 32 or lower surface 34 can be actuated to the change the shape.

As illustrated in FIGS. 5 and 6, the lower surface 32 is configured for being actuated to change the shape of the sub-flap 30. In particular, the lower surface 32 is actuated, and its connection to the upper surface 34 causes both the upper and lower surfaces 32, 34 to change their shape. However, it will be appreciated that the upper surface 32 could be the surface that is actuated, with the lower surface 34 being actuated in response based on its connection to the upper surface 32. The surface that is actuated can be referred to as the driven surface, with the opposite surface referred to as the non-driven surface.

With reference to FIGS. 5-8, to actuate the upper surface 32 or lower surface 34, the sub-flap includes at least one actuator 70. In one approach, two actuators 70 are provided. The actuators 70 can be disposed in various locations while still being capable of actuating the sub-flap 30.

Figure 7:
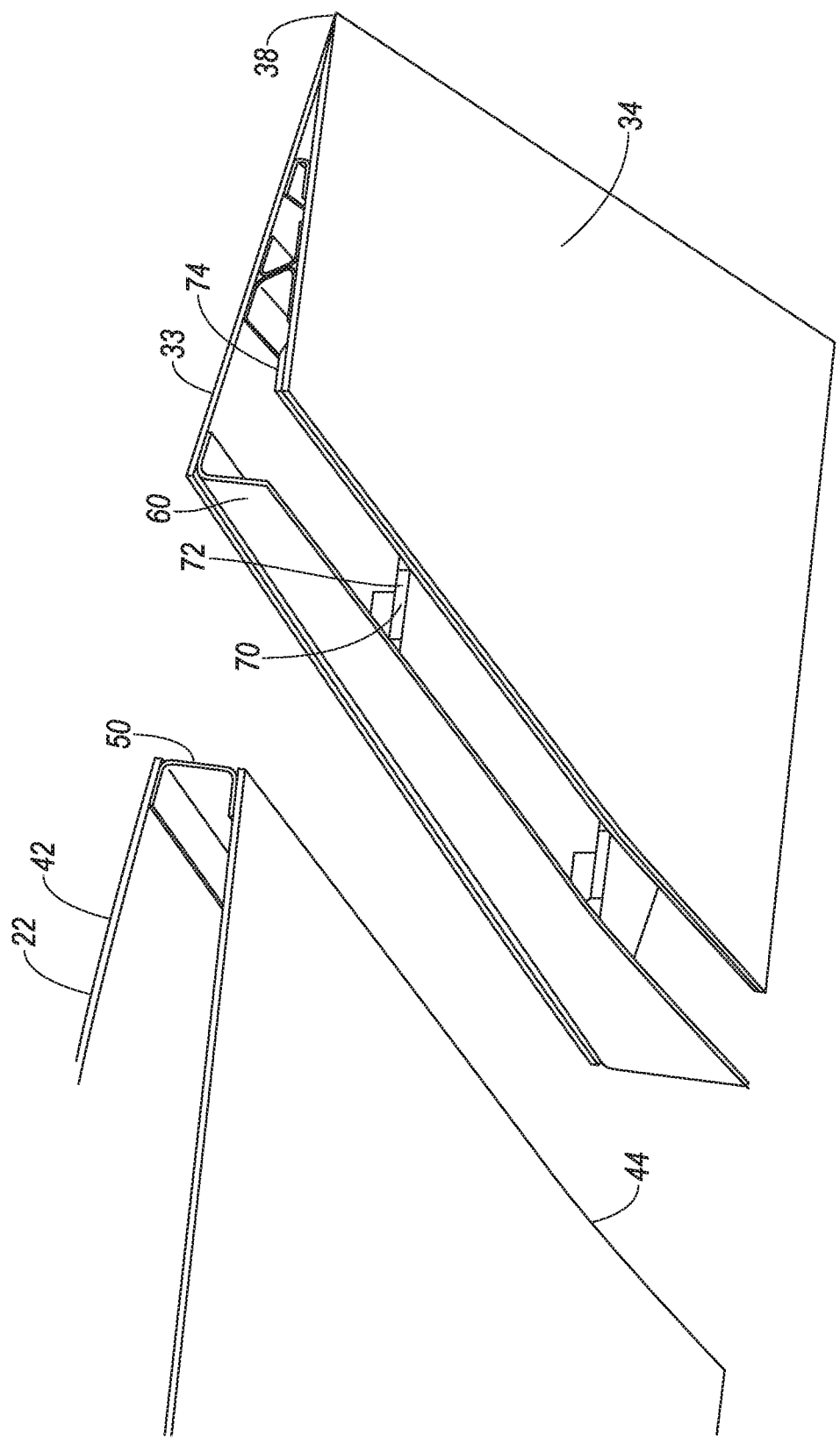
FIG. 7 is an exploded view showing one embodiment of a sub-flap module for mounting to the flap.
Figure 8:
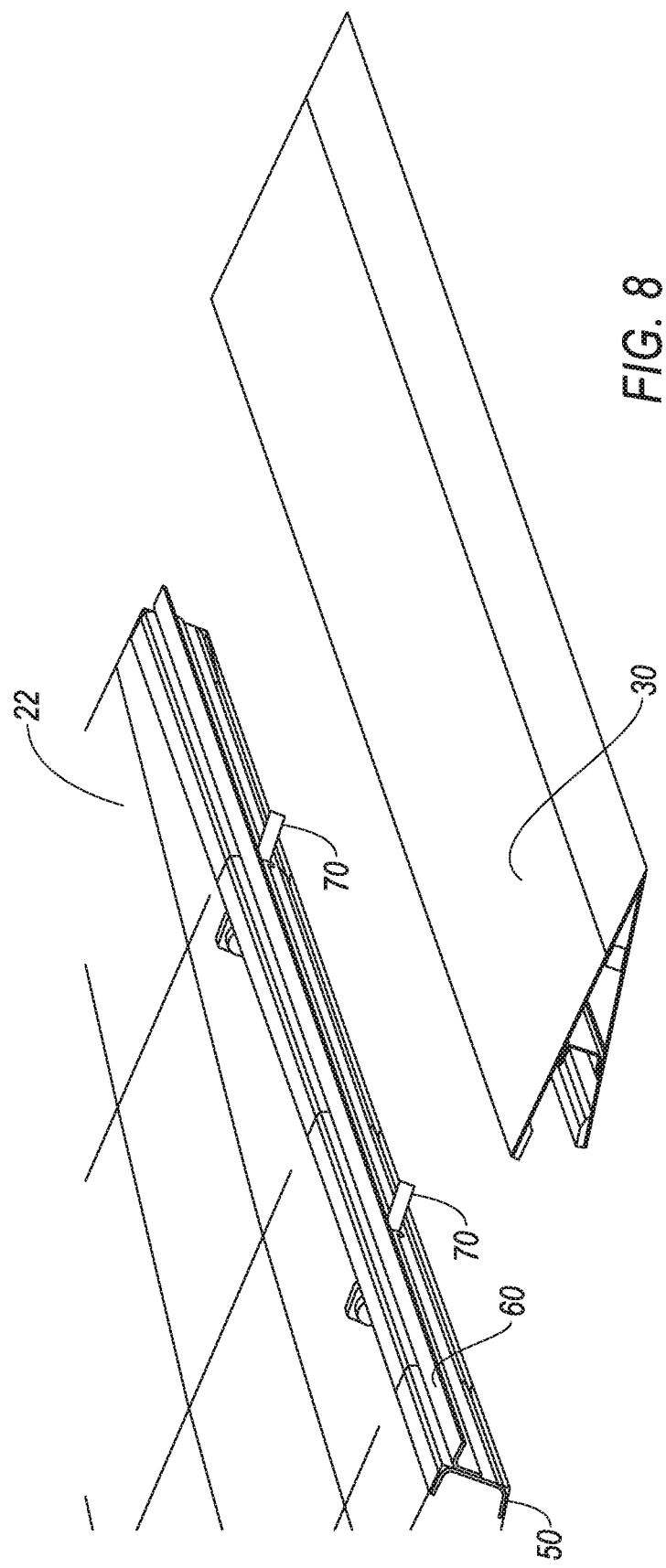
FIG. 8 is an exploded view showing another embodiment of a sub-flap module for mounting to the flap.

In one approach, the actuators 70 are in the form of electromechanical linear actuators having a rod 72 that is capable of being translated, extended, or retracted to various locations along the travel of the rod 72. As illustrated, the rod 72 is attached to the lower surface 32 of the sub-flap 30. More particularly, the rod 72 is attached to a drive bar 74 that is integrally formed with the lower surface 32 of the sub-flap 30 or attached to the lower surface 32. As illustrated in FIG. 6, the drive bar 74 is in the form of an increased thickness portion of the sub-flap lower surface 32. As shown in FIG. 7, the drive bar 74 is a separate piece that is attached to the lower surface 32.

The actuators 70 are preferably positioned at different lateral or span-wise positions along the sub-flap 30. Accordingly, one actuator 70 is positioned at an inboard location and another actuator 70 is positioned at an outboard location. Each of the actuators is attached to the drive bar 74 via corresponding rods 72. The actuators 70 are each independently actuatable in either the forward and rearward direction, and the degree of actuation (the amount that the rod 72 will extend or retract) is also independently controllable. As shown in FIGS. 5-7, the actuators 70 are attached to the bracket 60 of the sub-flap 30. However, the actuators 70 could alternatively be attached to other structure.

Figure 10:
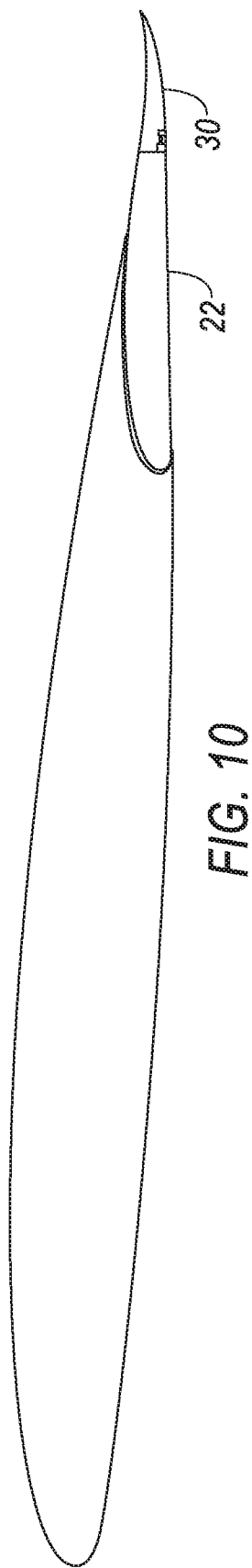
FIG. 10 is a cross-sectional side view of the flap and sub-flap, with the sub-flap deflected upward relative to the flap.

From a nominal position of the actuators 70, the sub-flap 30 is positioned in its nominal position (FIGS. 5 and 6). As illustrated in FIG. 10, to cause a positive or upward deflection of the sub-flap 30, the actuators 70 are actuated such that the rods 72 extend rearward and push on the drive bar 74 that is attached to or part of the lower surface 32. This causes the lower surface 32 to move rearward, and the attachment of the lower surface 32 to the upper surface 34 causes the apex 38 of the surfaces 32 and 34 to move upward, and the upper surface 32 and lower surface 34 to bend upward. The amount that the rod 72 extends determines the amount that the sub-flap 30 will deflect upward.

Figure 9:
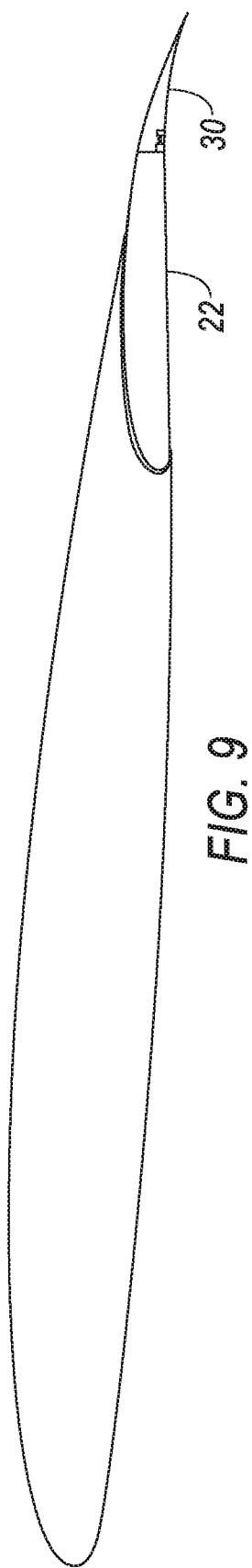
FIG. 9 is a cross-sectional side view of the flap and sub-flap, with the sub-flap deflected downward relative to the flap.
Figure 11:
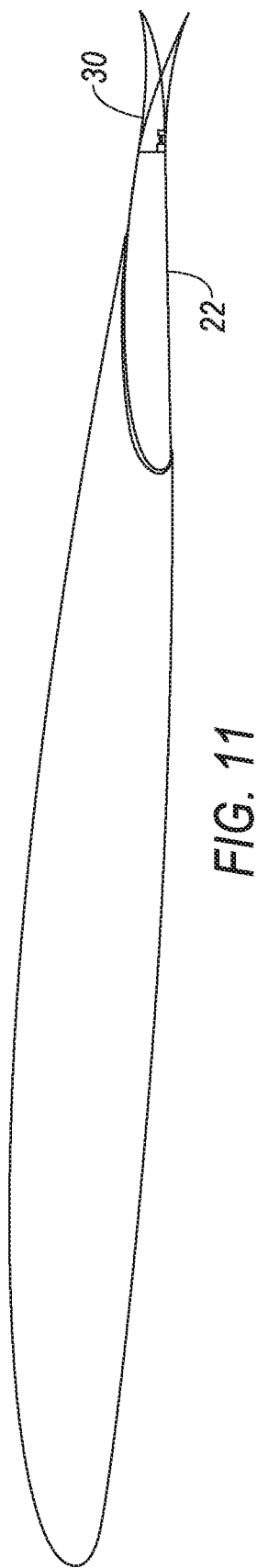
FIG. 11 is a cross-sectional side view of the flap and sub-flap, with the sub-flap illustrated in both a downward deflected and upward deflected position.

To cause the sub-flap 30 to deflect downward, either from the nominal position or from an upwardly deflected position, the rod 72 is retracted and moved in a forward direction. This, results in the lower surface 34 being pulled closer to the actuator, and the lower surface 34 and upper surface 32 are thereby deflected downward. FIG. 9 illustrates the sub-flap 30 is a downward or negatively deflected position relative to the flap 22. FIG. 11 illustrates both the upward deflection states and downward deflection states superimposed on each other for reference.

The above described relationship between the actuators 70 and the lower surface 34 would also apply to the upper surface 32. However, the resulting upward or downward deflection of the sub-flap 30 would be the opposite depending on the direction that the rod 72 extends. Rearward movement of the rod 72 would cause the sub-flap 30 to deflect downward and forward movement or the rod 72 would cause the sub-flap 30 to deflect upward.

As described above, the actuators 70 can be mounted at different locations. In one approach, the actuators 70 are mounted to the bracket 60 of the sub-flap and within the cavity 36 defined by the upper and lower surfaces 32, 34. In another approach, shown in FIG. 7, the actuators 70 can be mounted within the flap 22 at a position forward from the rear spar 50 and inside the upper and lower surfaces 42, 44 of the flap 22. In this approach, the rods 72 would extend through holes or passageways disposed in the bracket 60 and rear spar 50 allowing for the rods 72 to be able to reciprocate forward and rearward as required. In yet another approach (not shown), the actuators 70 can be disposed within the wing body 20.

As described above, the sub-flap 30 will change its shape in response to actuation of one of the surfaces (the driven surface), and the other surface (the non-driven surface) will move due to their connection to each other. The upper and lower surfaces 32 and 34 can be connected at further locations chord-wise between the front and rear of the sub-flap 30. As illustrated in FIG. 6, the sub-flap 30 includes a pair of webs or stringers 80 that extend between the upper and lower surfaces 32 and 34. The stringers 80 extend in a generally span-wise direction within the cavity 36 of the sub-flap 30. As illustrated, two stringers 80 are shown; however it will be appreciated that a single stringer 80 could be used or three of more stringers 80 could be used, as desired. Alternatively, zero stringers could be used. The stringers 80 can provide a linkage function between the upper and lower surfaces 32, 34 to transfer movement therebetween in addition to the linkage function and movement transfer function provided by the connection between the surfaces at the rear apex. In a case where there are no stringers, linkage and movement is still provided by the connection between the surfaces 32, 34 at the rear apex. The stringers 80 can also provide a load bearing functionality. In one approach, a rigid trailing edge plug 81 (shown in FIG. 6) can be provided aft of a rear most stringer 80 and provide a connection between the upper and lower surfaces 32, 34. The plug 81 can be solid, or a honeycomb structure with upper and lower surfaces, or the like, and can be readily replaced in the event that it is dented or otherwise damaged without requiring replacement of one or both surfaces. The plug 81 can be attached to the stringer 80 with the upper and lower surfaces 32, 34 being attached to the stringer 80, or the upper and lower surfaces 32, 34 can be attached directly to the plug 81. In the case of a plug 81, the plug 81 defines the trailing edge 18. The plug 81 could also be provided without the use of any stringers, and would be provided at the trailing edge 18 of the sub-flap 30, with the upper and lower surfaces 32, 34 being attached to the plug 81.

In one approach, the portion of the sub-flap 30 that is rearward from the rearmost stringer 80 may be a separate structure from the portion of the sub-flap that is forward from the rear-most stringer 80. In this approach, the upper and lower surfaces 32, 34 may terminate the location of the rear-most stringer 80, with separate upper and lower surfaces extending from the rear-most stringer to the apex 38, thereby providing an extension of the upper and lower surfaces 32, 34 that terminate at the rear-most stringer. This construction may be used with or without the plug 81, such that this separate portion may be filled with the plug 81, or may include open space between the rear-most stringer and the apex 38.

The stringers 80 can have various shapes. As illustrated, one stringer 80 is in the form a C-shape, and another is in the form of an I-shape. The I-shape can be formed by a pair of C-shaped members disposed back to back. Other stringer shapes and arrangements could also be used, for example an S-shape. As illustrated, the stringers 80 have a generally straight body section 81 that extends between the upper and lower surfaces 32, 34. In another approach, this section could be curved, allowing for variable resilience in compression and shear of the upper and lower surfaces 32, 34 relative to each other.

The sub-flap 30 can be provided as an independent module or as an assembled part of the flap 22. In module form, the sub-flap 30 can include the various combinations of components up to and including the rear spar 50 for the flap 22. In one module form, shown in FIG. 8, the sub-flap 30 could include, for example, only the upper and lower surfaces 32, 34, which could be mounted directly to the rear spar 50 of the flap or to the bracket 60 that is mounted to the rear spar 50, with the sub-flap 30 being connected to the actuators 70 disposed forward of the rear spar 50. In another approach, as shown in FIG. 7, the module form of the sub-flap 30 can include the upper and lower surfaces 32, 34, the actuators 70, and the bracket 60. It will be appreciated that various combinations and sub-combinations of the components mentioned above can be combined into module form for addition to the flap 22. This type of module construction can allow for easy retrofitting of existing flaps 22.

In another approach, the flap 22 and sub-flap 30 can be assembled together and be provided as an overall flap module for installation with an existing wing body 20.

In some instances, the bracket 60 and rear spar 50 can be consolidated into a single component or mounting member, or one can be eliminated while retaining the other and the upper and lower surfaces of the sub-flap 30 and flap 22 can each be attached to the remaining or consolidated component.

The sub-flap 30 can be deflected upward (negative camber) or downward (positive camber) as desired depending on various flight conditions. The amount of upward or downward deflection can be determined by a control system in response to other inputs, such as speed, altitude, wind speed, wind gusts, weight, fuel usage, attitude, roll, yaw, wing-loading, and the like, where the control system can determine whether positive or negative camber is desired.

Figure 12:
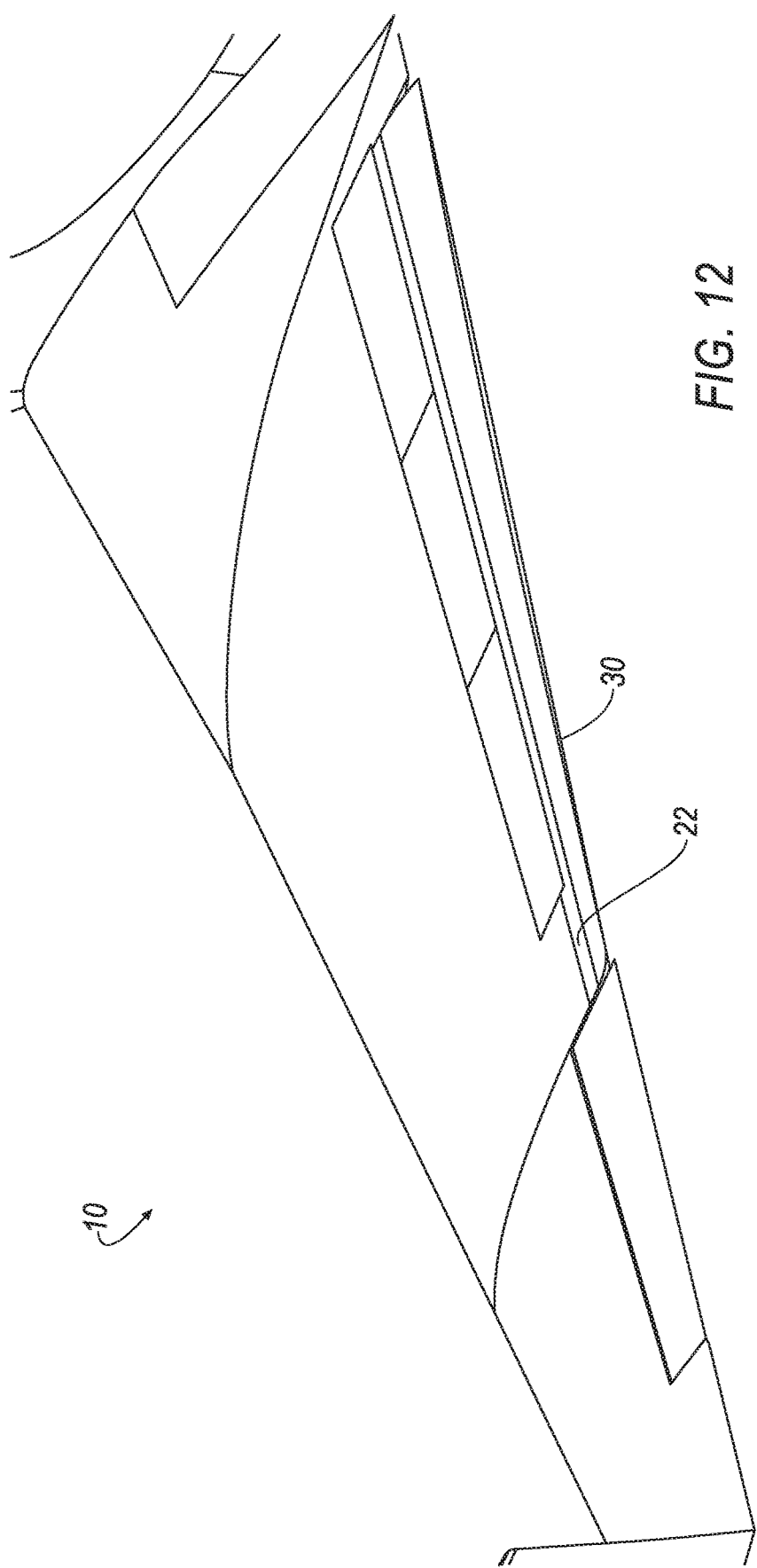
FIG. 12 is an isometric view of the sub-flap undergoing span-wise twist, with an inner end being deflected downward and an outer end being deflected upward.
Figure 13:
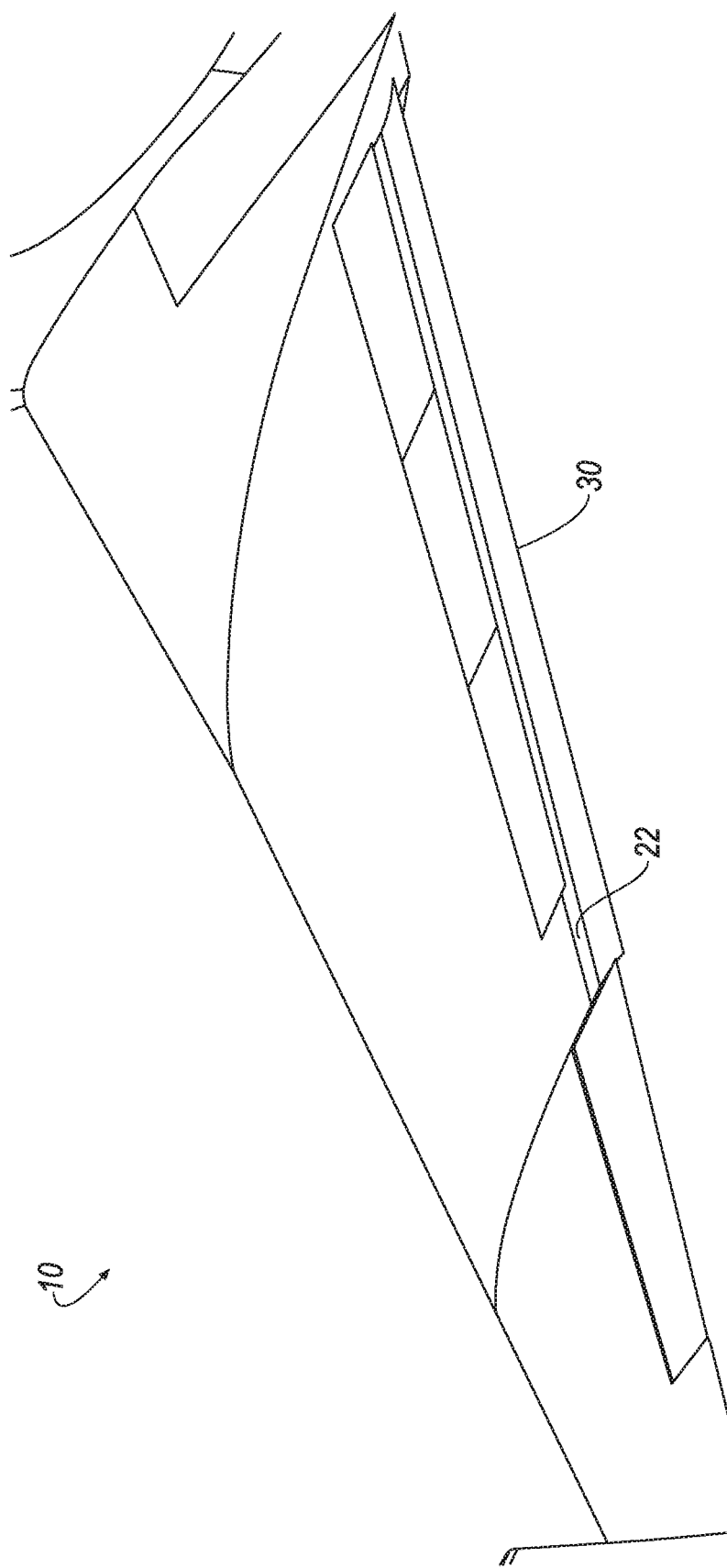
FIG. 13 is an isometric view of the sub-flap undergoing span-wise twist, with an outer end being deflected downward and an inner end being deflected upward.

With reference to FIGS. 12 and 13, in addition to upward or downward deflection, the sub-flap 30 can also be deflected in both the upward and downward direction at the same time, with one span-wise end of the sub-flap 30 being upwardly deflecting and the opposite span-wise end being deflected downwardly. This type of deflection can be referred to as "span-wise twist" as the sub-flap 30 appears twisted along the wingspan when viewed from the rear in a chord-wise direction.

Span-wise twist is affected by actuating the actuators 70 in opposite directions, with one rod 72 being moved forward and the other rod 72 being moved rearward. Such opposite actuation causes the drive bar 74 to rotate in plane with the actuator direction. This causes one side of the sub-flap 30 to be pulled and the other side to be pushed, causing one side to deflect downward and the other side to deflect upward, creating a twisted profile. FIG. 12 illustrates the outboard side of the sub-flap 30 being deflected upward, and the inboard side of the sub-flap 30 being deflected downward. FIG. 13 illustrates an opposite twisted orientation, with the inboard side up and the outboard side down.

In one approach, only one of the actuators 70 can be actuated, causing only one end of the sub-flap 30 to be deflected up or down. Additionally, one actuator could be actuated more than the other, causing a different amount of deflection at one end of the sub-flap 30 than the other. This differential deflection can be applied to both ends being deflected in the same direction to create a non-twisted but cambered profile, or in the opposite direction to create a twisted profile. When one actuator is actuated a first amount, and another actuator is actuated a second amount, and they are both actuated in the same direction, the resulting differential actuation results in a delta between inboard and outboard ends and can also be considered a twist. For purposes of discussion, span-wise twist will refer to instances where one portion of the sub-flap 30 is deflected upward and the other portion is deflected downward, and differential deflection will refer to instances where one portion deflects a different amount relative to the other portion. Span-wise twist is a type of differential deflection, with the differing amounts being positive and negative, even if the absolute value of the deflection is the same. For example, a deflection of +3 at one portion and −3 at the other portion is a differential deflection and also a span-wise twist. A deflection of +1 at one portion and +3 at the other portion is a differential deflection, but would not be a span-wise twist.

Span-wise twist can be used to provide multiple benefits before, during, or after flight. For example, it can be used for de-icing the surface of the airfoil. It can be actuated in a short response time to reduce wing loads due to wind gusts. It can be used to reduce wing loads due to wing-tip devices, such as winglets. It can be used to re-distribute the air loads along the span of the wing. It can be used to function as aileron to control roll. It can be used to reduce drag.

Figure 14:
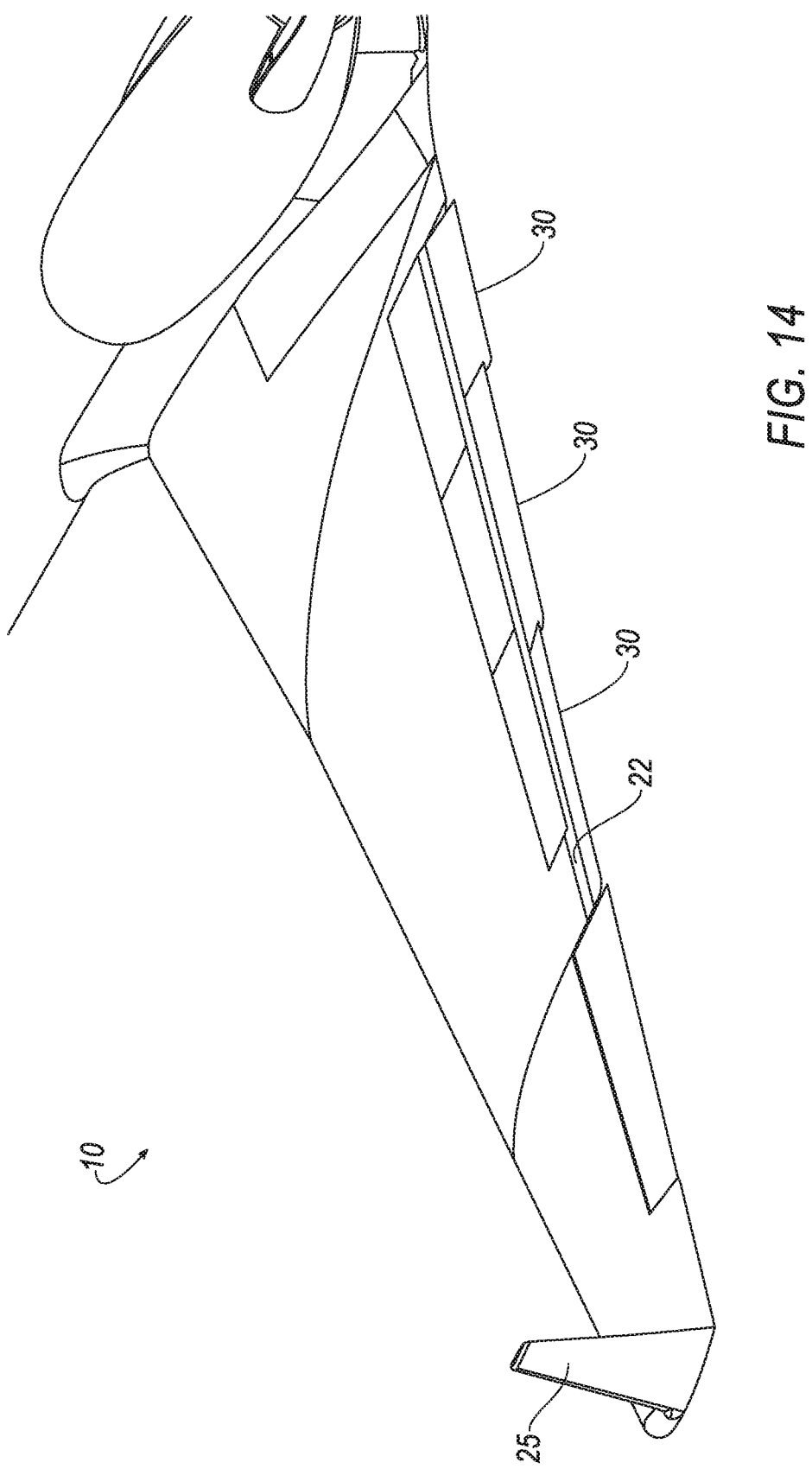
FIG. 14 is an isometric view of the flap having three sub-flaps attached thereto.

As described above, a single sub-flap 30 has been described as being attached to the flap 22. In another approach, and with reference to FIG. 14, multiple sub-flaps 30 can be attached to a single flap 22, with each sub-flap 30 being independently actuatable and operable in the same manner as described above. The use of multiple sub-flaps 30 can allow for further modification during various flight conditions. Multiple sub-flaps can be used to create an effect similar to the span-wise twist, by deflecting the inner most and outer most sub-flap 30 in opposite directions and leaving intermediate sub-flaps in a neutral position. Various other arrangements and deflections can also be used, including twisting each of the individual sub-flaps 30.

The sub-flap 30 has been described as being attached to the flap 22 of a traditional airplane wing. However, the sub-flap 30 can also be attached to other portions or a wing. For example, with reference to FIG. 15, the sub-flap 30 could be attached to the aileron 24, or to wing surfaces disposed outboard of the aileron or inboard of the flap 22. The sub-flap 30 could further be attached to flaps or other wing surfaces disposed on a winglet 25 or to flaps or wing surfaces that directly contact the winglet 25.

As described above, the sub-flap 30 is actuated by the actuators 70. The actuators 70 are preferably in the form of linear electromechanical actuators. Accordingly, the actuators 70 are electrically connected to a power source (not shown) and control system of the aircraft that will actuate the actuators 70 when necessary. The electrical connection to the actuators 70 can be accomplished via a wire harness 78 (FIG. 17), which can be in the form of any known wire harness capable of sending an electrical signal and providing an electrical current to the actuators 70. The actuators 70 can be in the form of a piezoelectric actuator, solenoid, motor-driven rotation-translation mechanism, or the like.

In another approach, the actuators 70 can be in the form of a hydraulic actuator, for example utilizing a cylinder-piston arrangement and/or pressure chamber accumulation to drive the actuators 70 between different actuation states. Biasing elements can also be tuned and used to achieve the desired actuator travel in response to predetermined hydraulic loading. In the case of a hydraulic based actuator, the wire harness 78 can include a conduit for hydraulic fluid to travel to and from the actuators 70. Of course, it will be appreciated that other types of actuators could also be used to provide the described actuating capabilities of the actuators 70.

With reference to FIGS. 16 and 17, the sub-flap 30, being part of the overall flap 22 or attached to the flap 22, will accordingly translate along with the flap 22 during different aircraft maneuvers. For example, during a landing condition, the flaps 22 are typically extended rearward from the wing body 20 as well as being deflected downward to create a positive camber of the wing 12 and improve the landing capability of the aircraft. This rearward extension of the flap 22 will likewise cause rearward movement of the sub-flap 30 therewith.

Rearward movement of the sub-flap 30 relative to the wing body 20 results in rearward movement of the actuators 70. However, the actuators 70 are connected to the power source and/or control system of the aircraft via the wire harness 78. The wire harness 78 is therefore preferably constructed in such a way that the wire harness 78 can extend along with the sub-flap 30, or alter its shape when the sub-flap 30 and actuators move rearward.

In one approach, as shown in FIG. 17, the wire harness 78 can be bent and allow the wire harness to extend 78 when pulled. In another approach, the wire harness 78 can include a looped portion that becomes smaller when pulled and larger when retracted back into a nominal position. In another approach, the wire harness 78 can be in the form of a coil. In another approach, the wire harness 78 can have a wave-shape. Various other arrangements for extending and retracting a wire harness can also be used. In another approach, no wire harness may be used, with power to the sub-flap 30 instead being provided when the flap 22 is stowed, where power is provided via mating connectors or contacts. The sub-flap 30 can be adjusted when the flap 22 is in the stowed position prior to deployment of the flap 22, and when the flap 22 is deployed, the sub-flap 30 would remain in its configuration that was set when the flap 22 was stowed.

Inclusion of the sub-flap 30 with the flap 22 allows for various flight-condition specific alterations to the aerodynamic properties of the aircraft. For example, in a cruising condition, the flap 22 is typically in a retracted and stowed position, where the flap 22 is generally not deflected, as shown in FIG. 9-11.

During the course of flight, conditions will inherently change due to changes in relative wind speed, such as changes in the headwind or tailwind affecting the flight of the aircraft, or in the case of short-term wind gusts. Additionally, as a particular flight continues, fuel is consumed, reducing the overall weight of the aircraft. Changes in relative wind speed or weight of the aircraft during flight can be detected by various sensors mounted to the aircraft or via software within the aircraft's control system. Other factors involving the flight of the aircraft can also be detected, such as turbulence.

In the event of a detected or calculated change to flight conditions, the sub-flap 30 can change its shape to result in a more efficient or more comfortable flight (reduce the effect of wind gusts), or reduced wing loading or stresses. For example, with the flap 22 in its stowed position during a traditional flight cruising state, the sub-flap 30 can be actuated to create either upward deflection and negative camber (FIG. 10) or downward deflection and positive camber (FIG. 9) of the sub-flap 30. These deflections of the sub-flap 30 can be relatively small to accomplish improvements to overall flight efficiency without resulting in large changes to aircraft's flight profile. The sub-flap 30 can be actuated to deflect upward for a period of time, downward for a period of time, or can alternate between upward and downward deflection (and negative and positive camber) as necessary. FIG. 11 illustrates both positive and negative camber states of the sub-flap 30 when the flap 22 is stowed. It will be appreciated that various patterns of positive and negative camber can be used as desired.

Changes in the shape of the sub-flap 30 can be done in a reactive manner to detected conditions occurring at the wing, or it can be done in predictive measure based on detected conditions that are expected to affect the wing.

In another condition, the sub-flap 30 can be actuated during landing to alter the camber of the wing 12 and flap 22. Alterations of this type can result in a condition where the flap 22 will not have to extend rearward and deflect downward as much as in the case of a traditional flap without a controllable sub-flap. Traditional flaps have a possible degree of rearward travel, and fully extending the flap results in additional wear and use of the flap extension and retraction mechanism. A traditional flap extension and pivoting position is illustrated in FIG. 16. By deflecting the sub-flap 30 downward during landing conditions, the flap 22 will not have to extend rearward as much as in the case of a traditional flap. An illustration of the flap 22 and sub-flap 30 in an extended and pivoted condition is shown in FIG. 17, with the sub-flap 30 being actuated to deflect downward, thereby requiring reduced extension and deflection of the flap 22 relative to the condition shown in FIG. 16.

As described above, the sub-flap 30 includes the upper and lower surfaces 32, 34 that are compliant and allow for changing the shape of the upper and lower surfaces 32, 34 to affect the flight of the aircraft. The sub-flap 30 is arranged to be attached to existing traditional flaps of traditional aircraft. However, the concepts associated with the sub-flap 30 described above can also be applied to an aircraft wing without a traditional flap.

Figure 18:
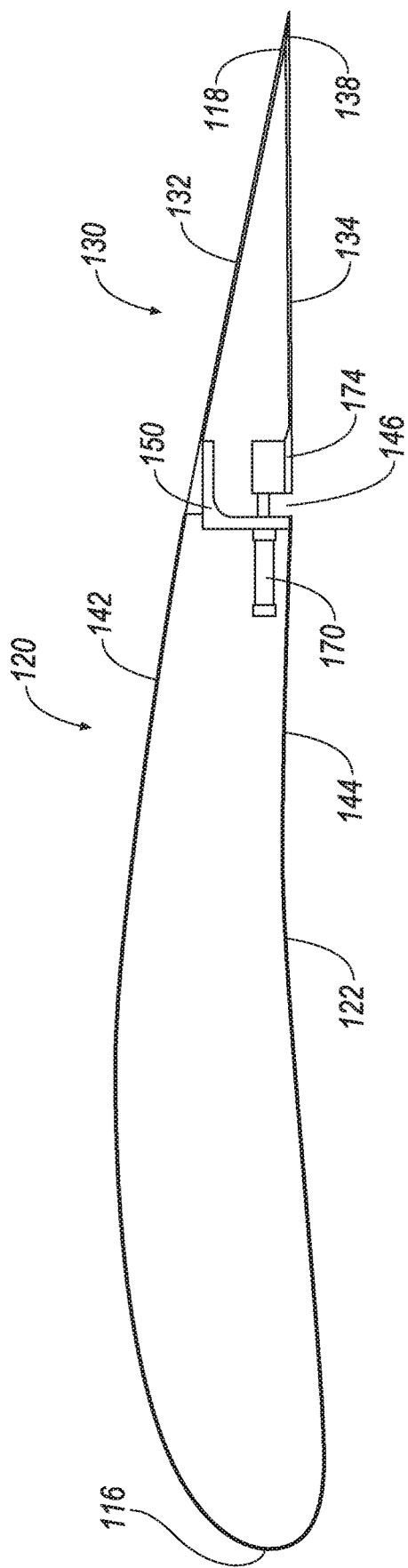
FIG. 18 is a cross-sectional view of an alternative embodiment of a wing with a compliant flap.
Figure 19:
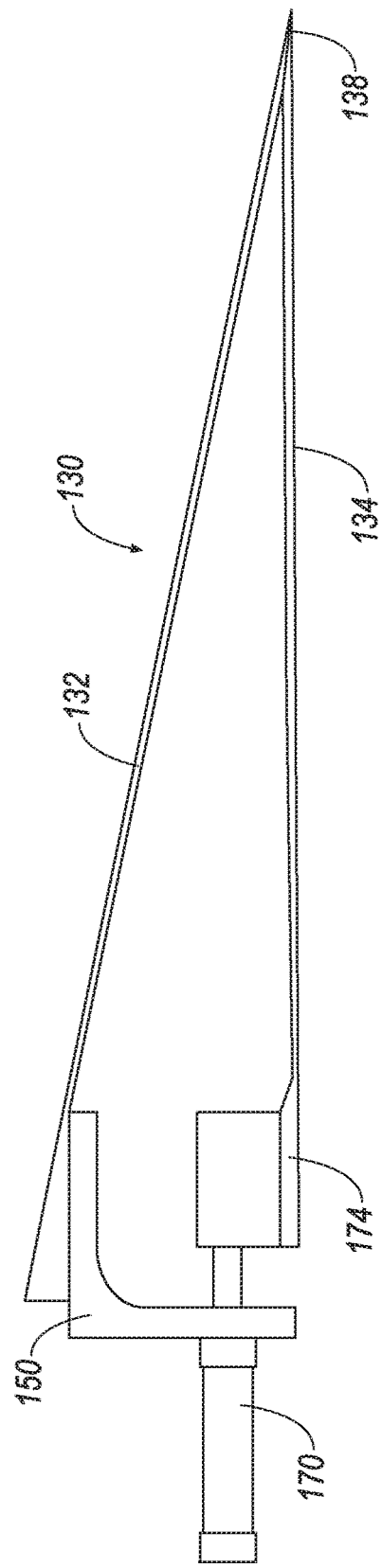
FIG. 19 is a cross-sectional view of the compliant flap of FIG. 18.

With reference to FIGS. 18 and 19, in an alternative embodiment, an aircraft wing 120 includes a compliant flap 130 including an upper surface 132 and a lower surface 134. The upper and lower surfaces 132, 134 are configured to change their shape relative to a non-compliant or fixed body portion 122 of the wing 120. It will be appreciated that the terms non-compliant or fixed refer to typical aircraft wing construction, and there are portions of the wing (such as other flaps or moveable parts) that can change their orientation. The compliant flap 130 described herein can function similarly to the sub-flap 30 described above, having similar construction options and operational abilities. However, rather than being attached to the flap 22, the compliant flap 130 is attached to the main wing 120.

The fixed portion 122 of the wing 120 also includes an upper surface 142 and a lower surface 144 that converge at a forward point or apex to define a leading edge 116. The leading edge 116 can be of any type of leading edge, such as having a rounded face typical to traditional airfoils. The fixed portion of the wing 120 will include various structural components and mechanisms known in the art. It will be appreciated that compliant upper and lower surfaces can also be used at the leading edge 116 and configured to morph and deflect upward or downward or twist. However, further reference herein will refer to compliant surfaces at the rear portion of the wing 120.

The upper surface 132 of the flap 130 is arranged to mate with and attach to or couple with the upper surface 142 of the wing 120. Similarly, the lower surface 134 of the flap 130 is arranged to mate with and attach to or couple with the lower surface 144 of the wing 120.

Alternatively, the lower surface 134 of the flap 130 and the lower surface 144 of the wing 120 can define a gap 146 therebetween, with the respective lower surfaces 134, 144 being aligned. The gap 146 defined between the respective lower surfaces 134, 144 will become smaller or larger depending on the direction of actuation of the lower surface 134. If the lower surface 134 is actuated away from the lower surface 144, the gap 146 will become larger, and the gap 146 will become smaller if the lower surface 134 is actuated to move toward the lower surface 144 of the wing 120. In another approach, the upper surfaces 132 and 142 can define the gap, with the lower surfaces 134, 144 being attached to each other.

The attachment of the flap 130 to the fixed portion 122 can be accomplished in a manner similar to that described above with respect to the sub-flap 30 and flap 22.

Similar to the above description regarding the sub-flap 30, the flap 130 includes one or more actuators 170. The actuators 170 are fixedly mounted to wing structure, and further mounted to one of the upper surface 132 and the lower surface 134, with the surface to which the actuator is mounted being the driven surface. Actuation of the driven surface causes the non-driven surface to move in response.

The upper and lower surfaces 132, 134 each extend in a direction rearward from the wing and join each other at a rear apex 138 that defines at least a portion of a trailing edge 118 of the wing 120. The connection between the upper and lower surfaces 132, 134 couples the upper and lower surfaces 132, 134 such that movement of one will cause movement of the other. The upper and lower surfaces 132, 134 are sufficiently compliant and flexible and resilient that they can each change their shape in response to actuation by the actuators 70.

The upper surface 132 and lower surface 134 are preferably made from a continuous structure. In one approach, the material of the surfaces is integrally formed. In another approach, the surfaces each have a monolithic structure. The materials for the surfaces of the sub-flap 30 as well as the surfaces of the flap 130 can be metal, such as aluminum, plastic, composites (glass or fiber), or a combination thereof.

The upper and lower surfaces 132, 134 can be ultimately coupled to the wing 120 at a location corresponding to a rear spar 150 of the wing 120. The wing 120 may include additional spars between the leading edge 116 and the rear spar 150. The rear spar 150 extends span-wise along the wing 120, similar to the rear spar 50 of the flap 22 and sub-flap 30 described above. The actuators 170 are preferably attached to the rear spar 150, or to other rigid structure that is attached to the rear spar, such as an additional bracket or the like.

In an alternative approach, the upper and lower surfaces 132, 134 can be attached to the respective upper and lower surfaces 142, 144 of the wing at a location that is disposed rearward of the rear spar 150 of the wing. In this approach, the actuators 170 can be attached to the rear spar 150, or they could be attached to auxiliary brackets that extend between the upper and the lower surfaces 142, 144 of the wing.

In another approach, the actuators 170 can be disposed forward of the rear spar 150 or other structure, with rods extending through holes or other apertures/gaps defined by intermediate structure.

Similar to the above-described sub-flap 30, the flap 130 may also include a drive bar 174. The drive bar is attached to the surface to be driven (the lower surface 134 as illustrated). In one approach, the drive bar 174 is integrally formed with the lower surface 134, such that it is in the form of monolithic structure, with the drive bar 174 defined by a greater thickness of the lower surface 134. In another approach, the drive bar 174 may be attached to or mounted to the lower surface 134 via rivets, welding, bonding, or other mechanical connection. Similarly, the drive bar 174 could be mounted to the upper surface 132 in the same manner as described above regarding the lower surface 132.

Similar to the above described sub-flap 30, the drive bar 174 can have a pair of actuators 170, or more, attached thereto that will drive the drive bar 174 as desired to change the desired shape of the upper and lower surfaces 132, 134. The use of two or more actuators 170 will also allow for the span-wise twist functionality described above.

The shape change of the upper and lower surfaces 132, 134, and more particularly the driving of one surface that affects the shape of each surface, can be accomplished with as little as the connection between the surfaces at the rear apex 138. Similar to the description above regarding the sub-flap 30, the apex 138 may be interpreted to include portions of the flap 130 that are disposed forward from the rear-most point of the flap 130, such that the apex 138 may refer to the rear portion of the flap 130. The upper and lower surfaces 132, 134 may be attached to each other via one or more stringers, and the apex can be considered to be the portion of the flap 130 that is rearward from the rear-most stringer, as described above and further described below.

The flap 130 may extend along the majority of the span-wise width of the wing 120. The flap 130 may be used in place of a traditional aileron at the outboard end of the wing 120. The wing 120 may include multiple flaps 130 disposed along the width of the wing 120, similar to the multiple sub-flaps 30 described above. The flap 130 may be actuated to produce a span-wise twist or differential deflection in the same manner described above with reference to the sub-flap 30.

Thus, the flap 130 is actuatable in the same way as the sub-flap, where a driven surface is actuated and a morphing force is transferred from the driven surface to the non-driven surface through a connection between the driven surface and the non-driven surface. The connection that ultimately transfers the morphing force from the driven surface to the non-driven surface may be located at the rear most point of the airfoil, such as at the rear apex, or through other connection locations forward from the apex, such as through a stringer or a rear portion of the airfoil that includes the apex.

Figure 20:
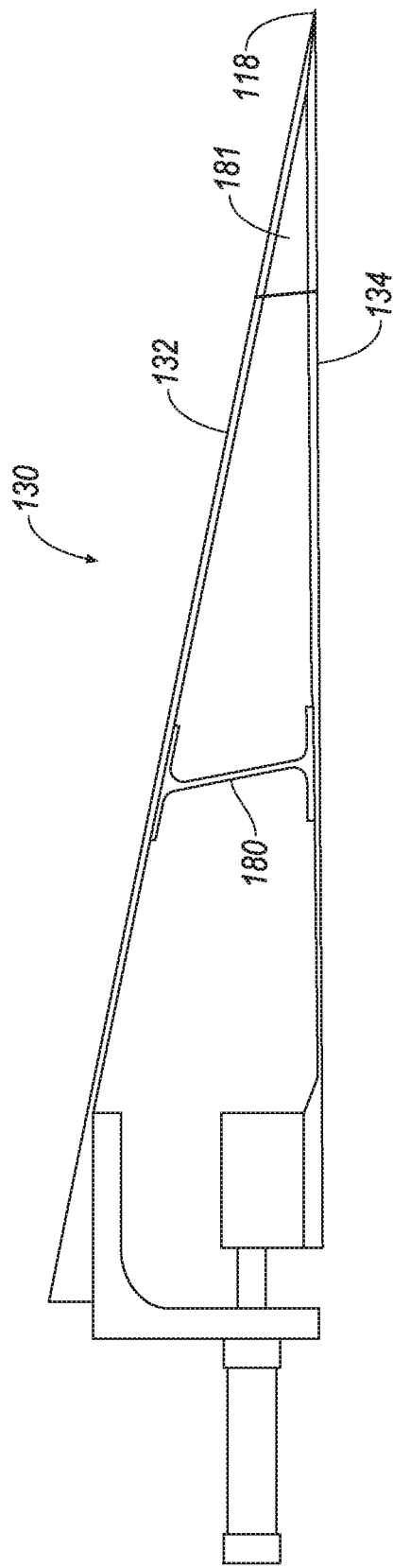
FIG. 20 is a cross-sectional view of the compliant flap having a stringer bonded to upper and lower surfaces of the compliant flap.
Figure 21:
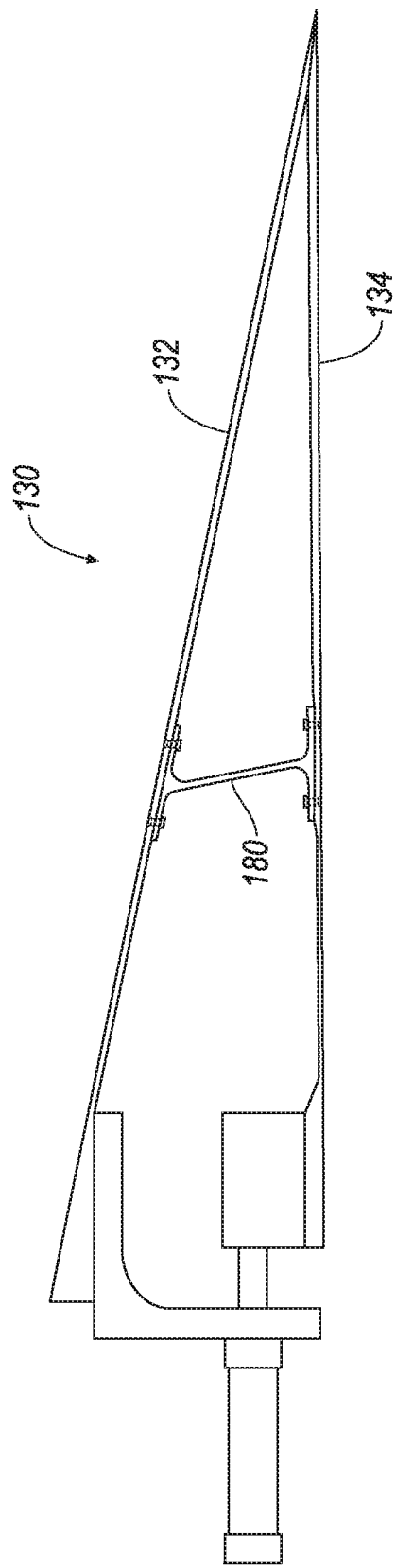
FIG. 21 is a cross-sectional view of the compliant flap having a stringer riveted to upper and lower surfaces of the compliant flap.

With reference to FIGS. 20 and 21, in a further embodiment, the flap 130 may include a web member or stringer 180 extending between the upper surface 132 and lower surface 134. The stringer 180 extends generally span-wise, from an inner end of the flap 130 to an outer end of the flap 130, and provides a further connection between the upper and lower surfaces 132, 134 in addition to the connection at the rear apex 138. The stringer 180 can be used to affect the way in which the non-driven surface shape changes in response to actuating the driven surface. The stringer 180 can further provide load bearing capabilities and other support for the upper and lower surfaces 132, 134.

In one approach, one stringer 180 is used; however, it will be appreciated that additional stringers can be used that extend between the upper and lower surfaces 132, 134 and span-wise to provide additional shape altering aspects and support aspects of the flap 130. For purposes of clarity and discussion, a single stringer 180 will be referenced. As described previously, in one approach, a rigid trailing edge plug 181 (shown in FIG. 20) can be provided aft of the rear most stringer 180 to allow for easy replacement in the event the trailing edge is damaged. The plug 181 could be attached to the stringer 180, with the upper and lower surfaces 132, 134 being attached to the stringer 180 and mating with the plug 181. Alternatively, the upper and lower surfaces 132 and 134 could be attached directly to the plug 181. The above description of the plug 81 also applies to the plug 181.

In one approach, the portion of the flap 130 rearward from the rear-most stringer 180 can be a separate piece that is attached to the rear-most stringer 180. In this approach, the upper and lower surface 132, 134 may terminate at the rear-most stringer the rear portion of the flap 130 may include surfaces that mate with the upper and lower surfaces 132, 134 at the rear-most stringer. This separate rear portion of the flap 130 may include the plug 181, or may be without the plug 181 and include open space between the rear-most stringer 180 and the apex 138. The separate rear portion may alternatively include the plug 181 along with open space between the plug and the rear-most stringer 180.

Accordingly, different constructions may be used for the trailing edge of the flap 130 or sub-flap 30. As used herein, reference to the trailing edge or the rear edge or the rear portion may refer to the rigid portion at the rear of the airfoil where a morphing force is transferred from the driven surface to the non-driven surface, and is not limited to the rear-most point of the airfoil. The rigid portion may be considered the portion that does not undergo any significant bending or shape change. The rigid portion can therefore include portions of the airfoil that are rearward from the rear-most stringer. However, it will be understand that some small degree of shape change may still occur through the rigid portion as a result of the transfer of the morphing force from the driven surface to the non-driven surface.

The stringer 180 can be aligned vertically or in a direction transverse to vertical. The orientation of the stringer can be altered to affect the way in which the shapes of the surfaces change in response to actuation. For example, the stringer 180 can be oriented such that the lower end is further rearward than the upper end (as illustrated), or the upper end of the stringer 180 could be further rearward than the lower end.

In an alternative approach, the stringer 180 can twist as it extends in the span-wise direction, such that the inner end of the stringer 180 is oriented in one transverse direction and the outer end is oriented in a different transverse direction, or to a smaller or greater degree in the same transverse direction.

The stringers 180 are connected to the upper and lower surfaces 132, 134 via any of the methods previously described herein for similar structure. In one form, the stringers 180 are attached to the upper and lower surfaces 132, 134 via rivets (FIG. 21). In another form, the stringers 180 are bonded to the surfaces (FIG. 20). Of course, a combination of bonding and riveting could also be used, as well as using other mechanical fastening means, such as screws and nut plates, or the like.

With reference to FIG. 21, in the case of rivets being used, the thickness of the upper and lower surfaces 132, 134 is preferably increased at the interface between the stringer 180 and the upper surface and lower surface 132, 134. This increased thickness can provide resistance to loading and shearing of the rivets caused by the movement of the surfaces 132, 134 in response to actuation. However, depending on the needs of the user, the thickness can remain generally constant through the interface area and surrounding areas.

It will be appreciated that the thickness of the upper and lower surfaces 132, 134 of the flap 130, as well as surfaces 32 and 34 of the sub-flap 30, can vary at different locations chord-wise as well as span-wise to further alter the loading and movement characteristics of the various surfaces.

Figure 22:
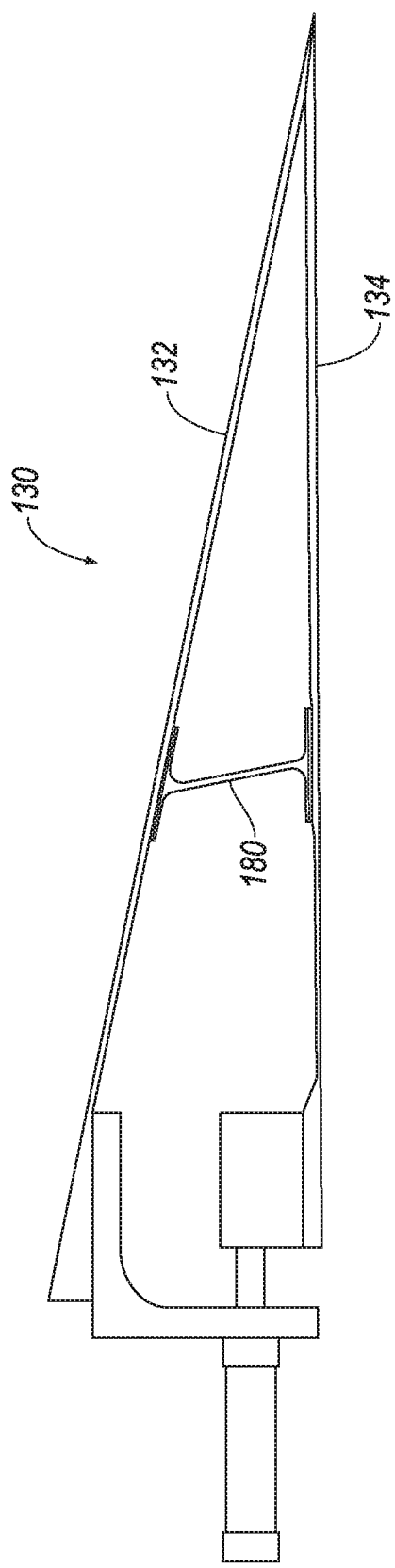
FIG. 22 is a cross-sectional view of the compliant flap having a tapering thickness in the chord-wise direction.
Figure 23:
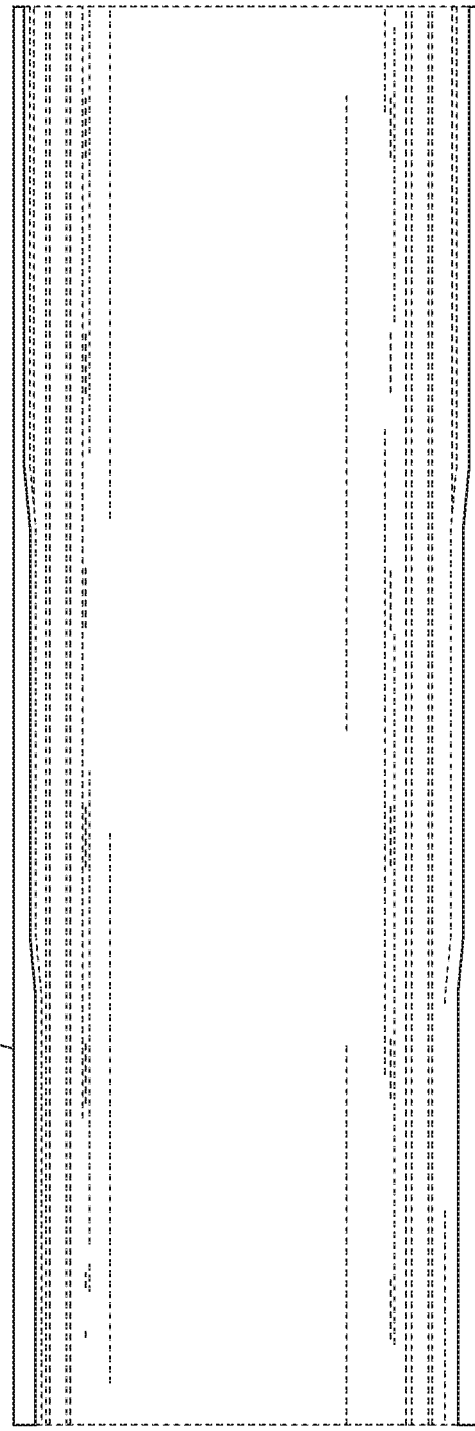
FIG. 23 is a cross-sectional view of the compliant flap having a tapering thickness in the span-wise direction.

With further regard to thickness of the upper and lower surfaces 132, 134 of the flap (and surfaces 32, 34 of the sub-flap 30), as shown in FIGS. 22 and 23, the thickness of the surface can taper or change in either the chord-wise direction (FIG. 22) or the span-wise direction (FIG. 23). The thicknesses of the upper and lower surfaces 132, 134 can be varied in both the chord-wise and span-wise direction. Such thickness variation can be accomplished by chemical milling or other known manufacturing methods. The upper and lower surfaces 132, 134 can have increased thicknesses are areas of high loading while having decreased thickness at areas of lower loading. For example, the thickness of the upper and lower surfaces 132, 134 could be increased at the areas where riveting is intended. Thickness may also be controlled by varying the size and shape of the plies in a multi-ply arrangement.

As shown in FIG. 20, in the case of bonding, the upper and lower surfaces 132,134 do not have a different thickness at the interface area between the surfaces and the stringer 180. The lack of mechanical connectors extending through the surfaces reduces the need for shear resistance. However, the surfaces 132, 134 can still include increased thickness at the interface areas, if desired.

The interface area between the stringer 180 and the upper and lower surfaces 132, 134 depends on the style and shape of the stringer 180, and the corresponding mounting portion of the stringer 180. For example, the stringer can have a cross-section shape similar to an I-beam with a pair of flanges extending from each side (FIGS. 20 and 21), or the stringer 180 can have a cross-section shape of a C-beam (FIG. 24), with flanges extending to only one side. Of course, other shapes could also be used. Moreover, the size of the flanges will also affect the size of the interface.

Figure 24:
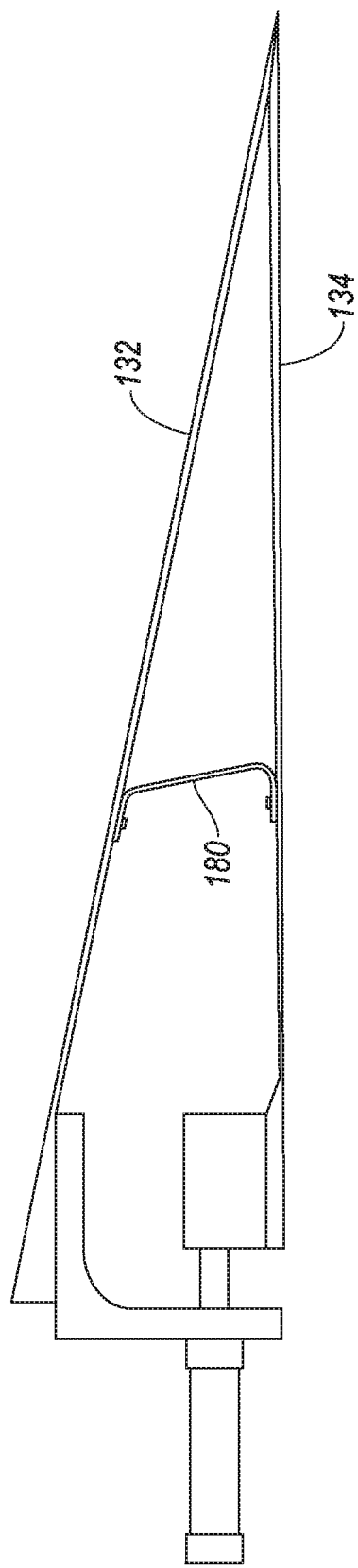
FIG. 24 is a cross-sectional view of the compliant flap illustrating a stringer having a C-beam shape.
Figure 25:
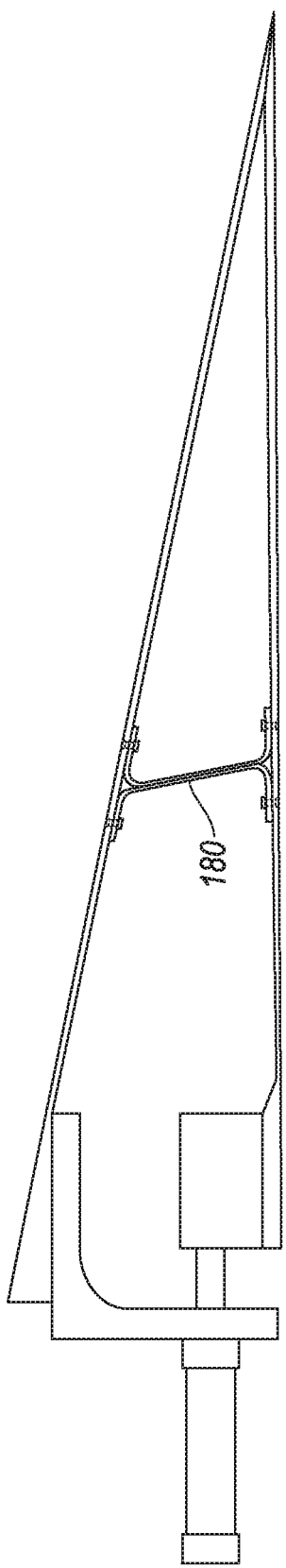
FIG. 25 is a cross-sectional view of the compliant flap illustrating an alternative stringer.

With further reference to the stringer 180, the stringer 180 can be constructed in further ways, or can be a combination of multiple components that combine to provide similar functionality. As described above, one type of stringer 180 is in the form of a C-beam (FIG. 24). The stringer 180 can also be defined by a pair of C-beams that are arranged back-to-back (FIG. 25). The body portions of each of the back to back C-beams can be arranged and oriented in a similar direction, such that the body portions contact each other substantially along the height of the body portions. In an alternative approach, the body portions can be spaced from each other such that they do not touch when they are in a nominal position.

Figure 26:
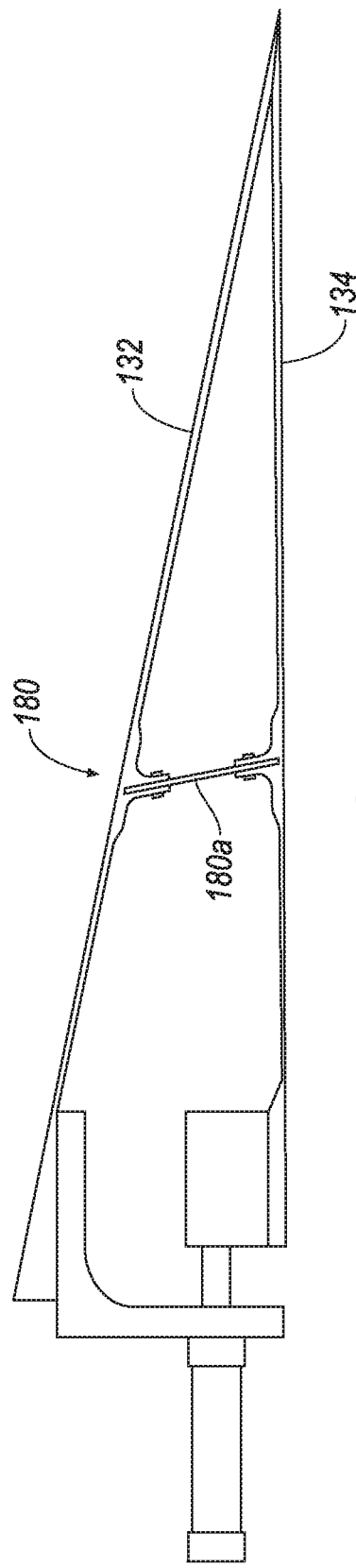
FIG. 26 is a cross-sectional view of the compliant flap illustrating an alternative stringer.
Figure 27:
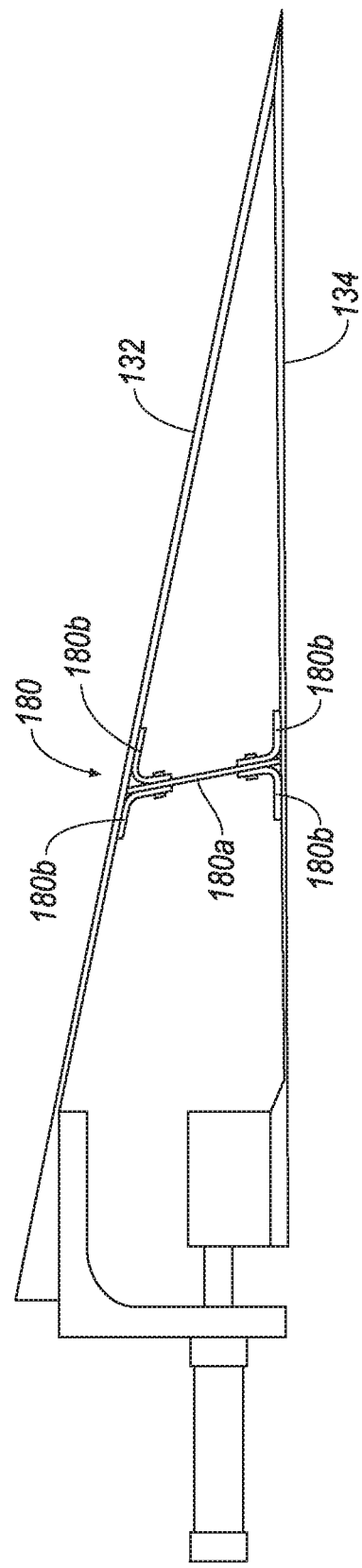
FIG. 27 is a cross-sectional view of the compliant flap illustrating an alternative stringer.

In an alternative embodiment of the stringer 180, as shown in FIG. 26, the flanges of the stringer can be made integral with the upper and lower surfaces 132, 134. In the area of the stringer 180, the surfaces 132, 134 can essentially be made thicker to define a flange-like shape. The flanges 180 can define a slot, into which a generally planar body portion 180a is inserted. The body portion 180a can be attached to the flange portions via rivets, bonding, welding, or other mechanical connection.

In yet another alternative embodiment, the stringers 180 can be formed by a combination of parts including separate flanges 180b and body member 180a. In this approach, the flanges 180b can be in the form of an L-shape and be mounted to the upper and lower surfaces 132, 134. The body portion 180a extends between the flanges 180b and is sandwiched between the flanges 180b.

With reference to FIG. 28, in another approach, the body portion 180a of the stringer 180 can have a curved profile in cross-section, such that it has an S-shape or C-shape, defining convex and concave surfaces in a chord-wise direction. These shapes increase the ability of the surfaces 132 and 134 to move toward each other, and may further affect the manner in which driving one of the surfaces causes the other surface to move in response. For example, with the stringer 180 having a curved shape, the driven surface can be pulled to reduce the "slack" that exists in the curve, and once the slack is removed, the stringer 180 will pull on the opposite non-drive surface.

With reference to FIG. 29, in yet another approach, the stringer 180 can be in the form of highly flexible material, such as a fabric, wire rope, mesh, or the like. In this approach, the stringer 180 will be generally flexible in compression, allowing the upper and lower surfaces 132, 134 to generally move toward each other with little resistance caused by the stringer 180. This is similar to the stringer 180 with a curved cross-section. However, in this approach, tension on the stringer 180 will generally cause the connected surface to move in response to movement of the driven surface as there is typically no "slack" in the stringer 180 in the nominal position. Of course, this flexible version of the stringer 180 could also be constructed to have a curved profile and include some "slack" if desired.

In another approach, the stringer 180 of FIG. 29 can be in the form of a rigid bar that is pivotable about its connection to the upper and lower surfaces 132, 134 to produce a "trapeze" linkage between the upper and lower surfaces 132, 134. This type of trapeze linkage can provide motion guidance of the lower surface 134 relative to the upper surface 132 while limiting the morphing force that is transferred between the surfaces.

Figure 30:
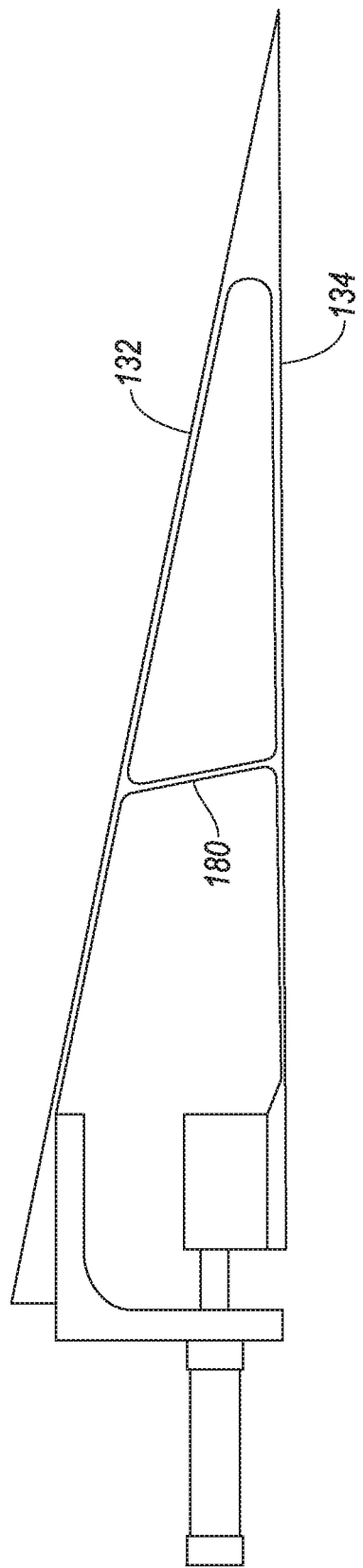
FIG. 30 is a cross-sectional view of the compliant flap with an integrally formed stringer.

With reference to FIG. 30, in yet another approach, the entire stringer could be integrally formed with the upper and lower surfaces 132, 134. Or, they could be molded with the upper and lower surfaces 132, 134 to create an integral structure. Alternatively, they can be extruded with the upper and lower surfaces 132, 134 to define a monolithic structure. The stringers could also be formed as skeleton or lattice-type structure with a composite material applied to or molded onto the skeletal structure to define an integral structure with the upper and lower surfaces.

In another approach, multiple stringers 180 can be combined to define a cross-sectional shape along with the upper and lower surfaces 132, 134. For example, a pair of stringers 180 can combine with the upper and lower surfaces 132, 134 to define a box-shape. The box can be in the form of a trapezoid, parallelogram, diamond, or the like. In another form, the stringer 180 can be in the form of a closed box cross-section that can be inserted between the upper and lower surfaces 132, 134 and mounted thereto as described above. The closed box can have four sides in one approach, or more than four sides if desired.

The above described variations of the stringer construction can be combined with each other to create various other structures. For example, a pair of L-brackets could be combined with a T-shaped stringer body and flange shape. Or a C-shaped stringer could be combined with a pair of L-brackets. Or integral flanges could be used at one surface with L-brackets at the opposite surface and a separate body portion attached to each.

The above described stringer variations have been described with reference to the upper and lower surfaces 132, 134, however these variations can also be applied to the sub-flap 30 and the upper and lower surfaces 32, 34.

Although the invention has been described in terms of specific embodiments and applications, persons skilled in the art may, in light of this teaching, generate additional embodiments without exceeding the scope or departing from the spirit of the invention described and claimed herein. Accordingly, it is to be understood that the drawing and description in this disclosure are proffered to facilitate comprehension of the invention, and should not be construed to limit the scope thereof.

What is claimed is:

1. An edge morphing arrangement for use with an elongated airfoil of an aircraft, the arrangement comprising:
    an upper surface having an inner end and an outer end and extending in a span-wise direction from the inner end to the outer end, the upper surface defining a rear edge and a front edge;
    a lower surface having an inner end and an outer end and extending in a span-wise direction from the inner end to the outer end, the lower surface defining a rear edge and a front edge;
    wherein the upper and lower surfaces are formed of a deformable compliant material that is load-bearing and resilient;
    wherein the upper and lower surfaces are coupled via a trailing edge enclosing a fixed angle such that movement of one of the upper and lower surfaces will cause corresponding movement of the other of the upper and lower surfaces via the trailing edge;
    an actuator coupled to a driven surface comprising one of the upper surface and the lower surface, the actuator being configured to move the driven surface in both a rearward and a forward direction relative to the actuator, wherein movement of the driven surface causes corresponding movement of a non-driven surface comprising the upper surface or the lower surface that is not the driven surface;
    wherein rearward movement of the driven surface results in the driven surface changing shape with the rear edge thereof moving in a first direction and causing the non-driven surface to change shape;
    wherein forward movement of the driven surface results in the driven surface changing shape with the rear edge thereof moving in a second direction that is opposite the first direction and causing the non-driven surface to change shape.

2. The arrangement of claim 1 further comprising a bracket having an inner end and an outer end and extending in a span-wise direction between the inner end and the outer end, wherein at least one of the upper and lower surface is fixedly attached to the bracket.

3. The arrangement of claim 2, wherein the actuator is fixedly mounted to the bracket.

4. The arrangement of claim 1 further comprising a drive bar attached to or integrally formed with the driven surface, wherein the actuator is attached to the drive bar for actuating the drive bar, the actuator being capable of actuating the drive bar in both the forward and rearward direction relative to the actuator.

5. The arrangement of claim 1 further comprising an airfoil flap, the flap including upper and lower control surfaces having inner and outer ends, the upper and lower control surfaces each having a front edge and a rear edge, the upper and lower control surfaces extending span-wise between the inner and outer ends, the flap further including a rear spar that extends between the rear edges of the upper and lower control surfaces of the flap and extends span-wise between the inner and outer ends, wherein at least one of the upper and lower surfaces is coupled to the rear spar and the actuator is coupled to the rear spar.

6. The arrangement of claim 5, further comprising a bracket mounted to the upper surface, wherein the actuator is mounted to the bracket, and the bracket is further mounted to the rear spar.

7. The arrangement of claim 1, further comprising a stringer extending between and connecting the upper and the lower surfaces, the stringer extending in a span-wise direction.

8. The arrangement of claim 7, wherein the upper and lower control surfaces are operative coupled via the stringer, which is attached to the rear edges of the upper and lower surfaces.

9. The arrangement of claim 7, wherein the stringer is attached to at least one of the upper and lower surfaces, wherein a thickness of at least one of the upper surface or lower surface is increased at an area corresponding to an interface between the stringer and the upper or lower surface.

10. The arrangement of claim 1, wherein the actuator comprises a first actuator, the arrangement further comprising a second actuator, wherein the first and second actuators are each connected to the driven surface, and the actuators are independently actuatable to move the driven surface both forward and rearward and being actuatable to move the driven surface a different amount at the first actuator relative to the second actuator to cause a differential deflection of the driven surface.

11. The arrangement of claim 10, wherein an inner end of the rear edge of the driven surface moves in a first direction and an outer end of the rear edge of the driven surface moves in a second direction resulting in the rear edge having a span-wise twist shape in response to actuating the first actuator in a first direction and actuating the second actuator in a second direction that is opposite the first direction.

12. A method of integrating an edge morphing arrangement with an elongated airfoil, the method comprising the steps of:
providing an elongated airfoil having an upper control surface and a lower control surface, the upper and lower control surfaces extending in a span-wise direction between an inner end and an outer end;
providing an edge morphing arrangement to the elongated airfoil, the edge morphing arrangement comprising a compliant upper surface and a compliant lower surface that will change shape in response to actuation by an actuator, the compliant upper surface and compliant lower surface being coupled via a trailing edge enclosing a fixed angle, the actuator being coupled to a driven compliant surface comprising one of the compliant upper surface or compliant lower surface with the other of the compliant upper surface or compliant lower surface being a non-driven compliant surface, wherein in response to actuation of the actuator, the driven compliant surface will move and change shape, and the non-driven compliant surface will move and change shape via the trailing edge;
wherein the upper surface of the airfoil is aligned with the compliant upper surface of the edge morphing arrangement to define an upper interface and the lower surface of the airfoil is aligned with the compliant lower surface of the edge morphing arrangement to define a lower interface.

13. The method of claim 12, further comprising providing a rigid mounting member that extends in a span-wise direction between an inner end and an outer end thereof and further extending between the upper interface and the lower interface, wherein the actuator is coupled to the rigid mounting member, wherein the rigid mounting member is provided with the elongated airfoil in the form of a rear spar and extends between the upper and lower surfaces of the elongated airfoil, the method further comprising the steps of mounting the non-driven surface to the rear spar and mounting the actuator to the rear spar.

14. The method of claim 12, further comprising providing a rigid mounting member that extends in a span-wise direction between an inner end and an outer end thereof and further extending between the upper interface and the lower interface, wherein the actuator is coupled to the rigid mounting member, wherein the rigid mounting member is provided with the edge morphing arrangement in the form of a bracket mounted to the non-driven surface, with the actuator mounted to the bracket and coupled to the driven surface.

15. The method of claim 14, wherein the elongated airfoil includes a rear spar extending between the upper surface and lower surface of the airfoil, wherein the upper surface and lower surface are mounted to the rear spar, the method further comprising the step of mounting the bracket to the rear spar.

16. The method of claim 14, further comprising the step of mounting the upper and lower surfaces of the elongated airfoil to the bracket.

17. The method of claim 12, wherein the upper control surface of the airfoil and the compliant upper surface of the edge morphing arrangement are provided as a continuous unitary structure.

18. An edge morphing arrangement for an airfoil, the edge morphing arrangement comprising:
a compliant upper surface extending in a span-wise direction between an inner end and outer end thereof, the compliant upper surface having a generally continuous construction;
a compliant lower surface extending in a span-wise direction between an inner end and outer end thereof, the compliant lower surface having a generally continuous construction;
wherein the compliant upper surface and the compliant lower surface are connected at a connection extending in a span-wise direction between an inner end and an outer end thereof;
at least one actuator coupled to a driven compliant surface, the driven compliant surface comprising one of the compliant upper surface or the compliant lower surface, the other of the compliant upper surface or compliant lower surface being a non-driven compliant surface;
wherein the driven surface is capable of being driven rearward, being driven forward, and being driven such that a first portion of the driven surface is driven a different amount relative to a second portion to cause a rotation of the driven surface;

wherein rearward movement of the driven surface results in the driven surface changing shape with a rear edge of the driven surface moving in a first direction and causing the non-driven surface to change shape;

wherein forward movement of the driven surface results in the driven surface changing shape with the rear edge moving of the driven surface moving in a second direction that is opposite the first direction and causing the non-driven surface to change shape;

wherein rotational movement of the driven surface results in the driven surface changing shape with a first portion of the rear edge of the driven surface deflecting a first amount and a second portion of the rear edge of the driven surface deflecting a second amount that is different than the first amount, such that the rear edge of the driven surface undergoes a differential deflection or a span-wise twist.

19. The arrangement of claim 18, wherein the actuator comprises a first actuator, the arrangement further comprising a second actuator, and the first and second actuators are actuated in the same direction to move the edge forward or rearward, and the first and second actuators are actuated a different amount or in opposite directions to cause the differential deflection or the span-wise twist, respectively.

20. The arrangement of claim 18, wherein the compliant upper and lower surfaces are respectively coupled to an upper and lower surface of an airfoil.

* * * * *